(12) United States Patent
Chikamoto et al.

(10) Patent No.: US 7,922,311 B2
(45) Date of Patent: Apr. 12, 2011

(54) INK-JET HEAD AND METHOD OF MANUFACTURING THE SAME

(75) Inventors: Tadanobu Chikamoto, Nagoya (JP); Atsuo Sakaida, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1140 days.

(21) Appl. No.: 11/610,491

(22) Filed: Dec. 13, 2006

(65) Prior Publication Data

US 2007/0139498 A1  Jun. 21, 2007

(30) Foreign Application Priority Data

Dec. 16, 2005  (JP) ................................ 2005-362833

(51) Int. Cl.
*B41J 2/175* (2006.01)
*B41J 2/05* (2006.01)

(52) U.S. Cl. ................. 347/93; 347/65; 347/85

(58) Field of Classification Search .............. 347/93, 347/84, 85, 63, 65, 64, 71, 72
See application file for complete search history.

(56) References Cited

U.S. PATENT DOCUMENTS

| | | | | |
|---|---|---|---|---|
| 4,995,977 A * | 2/1991 | Hilgendorff et al. | .... | 210/321.69 |
| 5,399,265 A * | 3/1995 | Nehls | ............................ | 210/490 |
| 5,489,930 A * | 2/1996 | Anderson | ........................ | 347/71 |
| 5,610,645 A * | 3/1997 | Moore et al. | ....................... | 347/93 |
| 6,086,195 A * | 7/2000 | Bohorquez et al. | ............. | 347/93 |
| 6,254,229 B1 * | 7/2001 | Bohorquez et al. | ............. | 347/93 |
| 6,592,216 B2 * | 7/2003 | Slenes et al. | ..................... | 347/94 |
| 6,685,299 B2 * | 2/2004 | Hirota | .............................. | 347/20 |
| 6,955,418 B2 * | 10/2005 | Ito | ..................................... | 347/68 |
| 6,986,571 B2 * | 1/2006 | Dudenhoefer et al. | ......... | 347/93 |
| 7,044,591 B2 * | 5/2006 | Taira | ............................... | 347/93 |
| 7,396,111 B2 * | 7/2008 | Watanabe et al. | ............... | 347/50 |
| 7,484,835 B2 * | 2/2009 | Kim et al. | ........................ | 347/67 |
| 2002/0175976 A1 * | 11/2002 | Okuda | ............................. | 347/71 |
| 2002/0196315 A1 * | 12/2002 | Isono et al. | ...................... | 347/71 |

(Continued)

FOREIGN PATENT DOCUMENTS

EP  0564276 A2  10/1993

(Continued)

OTHER PUBLICATIONS

Machine Translation for JP11277758; Obtained from Searching PAJ website (http://www19.ipdl.inpit.go.jp/PA1/cgi-bin/PA1INIT?1273352423836).*

(Continued)

*Primary Examiner* — Stephen D Meier
*Assistant Examiner* — Leonard S Liang
(74) *Attorney, Agent, or Firm* — Baker Botts L.L.P.

(57) ABSTRACT

An ink-jet head has a passage component made of resin and a filter plate through which ink is filtered. The filter plate is fixed to the passage component and has a melting point higher than that of the passage component. The filter plate has an annular region and an inner region, and holes are formed through the filter plate in the annular and inner regions. The passage component has a filter support face that is in contact with the annular region but out of contact with the inner region. A holder is formed on the filter support face. The holder penetrates through at least one of the holes formed in the annular region and covers the other face of the filter plate.

19 Claims, 14 Drawing Sheets

U.S. PATENT DOCUMENTS

| | | | |
|---|---|---|---|
| 2003/0103116 A1* | 6/2003 | Sugahara et al. | 347/71 |
| 2003/0197767 A1* | 10/2003 | Dudenhoefer et al. | 347/93 |
| 2004/0036751 A1* | 2/2004 | Giere et al. | 347/93 |
| 2004/0056937 A1* | 3/2004 | Ito | 347/93 |
| 2004/0179057 A1* | 9/2004 | Yamada | 347/20 |
| 2004/0257415 A1* | 12/2004 | Arakawa et al. | 347/93 |
| 2005/0001883 A1* | 1/2005 | Shin et al. | 347/63 |
| 2005/0225608 A1* | 10/2005 | Ito | 347/68 |
| 2006/0001718 A1* | 1/2006 | Shimizu | 347/93 |

FOREIGN PATENT DOCUMENTS

| | | | |
|---|---|---|---|
| JP | H08-080616 A | | 3/1996 |
| JP | H11-277758 A | | 10/1999 |
| JP | 2000-238280 A | | 9/2000 |
| JP | 2002361893 A | * | 12/2002 |
| JP | 2003-305867 A | | 10/2003 |
| JP | 2004-174833 A | | 6/2004 |
| JP | 2004-268454 A | | 9/2004 |

OTHER PUBLICATIONS

Japan Patent Office, Notice of Reasons for Rejection in counterpart Patent Application No. JP 2005-362833, mailed Mar. 2, 2010.

European Patent Office, European Search Report for Related EP Application No. 06025691, dated Mar. 23, 2007.

The State Intellectual Property Office of the People's Republic of China, Notification of Second Office Action in counterpart Patent Application No. CN 200610165743X, mailed Jul. 31, 2009.

European Patent Office, Office Action for Patent Application No. EP 06 025 691.4 (counterpart to above-captioned patent application), dated Feb. 7, 2011.

* cited by examiner

SUB SCANNING DIRECTION
MAIN SCANNING DIRECTION

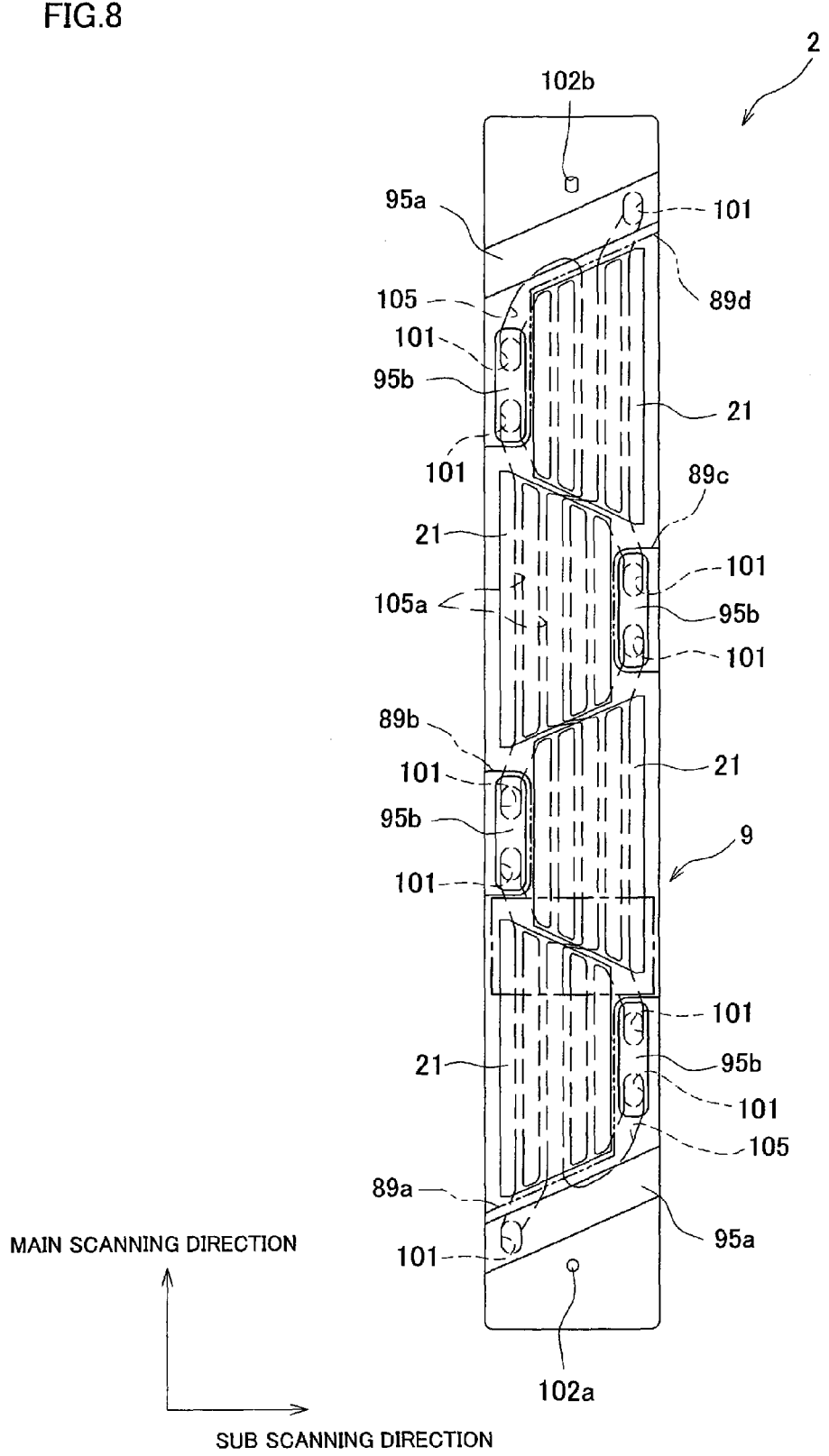

US 7,922,311 B2

INK-JET HEAD AND METHOD OF MANUFACTURING THE SAME

BACKGROUND OF THE INVENTION

1. Field of the Invention

The present invention relates to an ink-jet head that ejects ink from a nozzle, and also to a method of manufacturing the ink-jet head.

2. Description of Related Art

Japanese Patent Unexamined Publication No. 2004-268454 discloses an ink-jet head in which a joint member is bonded by an adhesive to a filter plate that is mounted on a head unit. The joint member has four cylinders and a flange that is integrally connected to the cylinders. The four cylinders have passages formed therein, and respectively communicate with four ink supply ports that are formed on the head unit. In portions of the filter plate opposed to the respective ink supply ports, many holes are formed. By an epoxy-base adhesive, the flange is bonded to such a region of the filter plate that surrounds the holes. On a face of the flange which is to be bonded to the filter plate, a groove is formed so as to avoid openings of the passages that are formed in the respective cylinders. An adhesive used for bonding the flange to the filter plate enters the groove. After being solidified, the adhesive serves as a partition wall for partitioning the passages that are formed in the cylinders. This can prevent mixture of colors of ink flowing through the respective passages. In addition, since both of the flange and the filter plate are metal members, the adhesive existing between the two metal members exhibits adhesion to both of them.

SUMMARY OF THE INVENTION

In the ink-jet head disclosed in the above-mentioned document, however, if either one of the flange and the filter plate is made of a resin, the adhesive cannot exhibit sufficient adhesion and the filter plate may be separated.

An object of the present invention is to provide an ink-jet head that suppress separation of a filter plate, and also to provide a method of manufacturing the ink-jet head.

According to a first aspect of the present invention, there is provided an ink-jet head comprising a passage component made of resin and a filter plate through which ink is filtered. The filter plate is fixed to the passage component and has a melting point higher than that of the passage component. The filter plate has an annular region and an inner region surrounded by the annular region, and a plurality of holes are formed through the filter plate in a thickness direction of the filter plate, in the annular region and the inner region, respectively. The passage component has a filter support face that supports one face of the filter plate extending in a direction perpendicular to the thickness direction. The filter support face is in contact with the annular region but out of contact with the inner region. A holder is formed on the filter support face. The holder penetrates through at least one of the holes formed in the annular region and covers the other face of the filter plate.

According to a second aspect of the present invention, there is provided a method of manufacturing an ink-jet head that includes a passage component made of resin and a filter plate through which ink is filtered. The filter plate is fixed to the passage component and has a melting point higher than that of the passage component. The method comprises the steps of: preparing the passage component having an annular face that annularly extends in a plane, a step face that is continuous with an inner circumferential border of the annular face and extends in a direction crossing the plane, and a protrusion that is formed on the annular face; preparing the filter plate through which a plurality of holes are formed in a thickness direction of the filter plate; bringing one face of the filter plate into contact with the protrusion while opposing one of the holes to the protrusion; and heating the protrusion and pressing the filter plate to the annular face, in such a manner that the melted protrusion is embedded in at least one of the holes and, in its portion beyond the holes, radially expands thus having a diameter larger than a diameter of the holes, to thereby fix the filter plate to the passage component.

In the first and second aspects described above, the filter plate is fixed to the passage component by means of the holder or the protrusion. This can reduce a problem of separation of the filter plate.

BRIEF DESCRIPTION OF THE DRAWINGS

Other and further objects, features and advantages of the invention will appear more fully from the following description taken in connection with the accompanying drawings in which:

FIG. 8 is a plan view of a head main body that is included in the ink-jet head;

DESCRIPTION OF THE PREFERRED EMBODIMENTS

In the following, a certain preferred embodiment of the present invention will be described with reference to the accompanying drawings.

Figure 1:
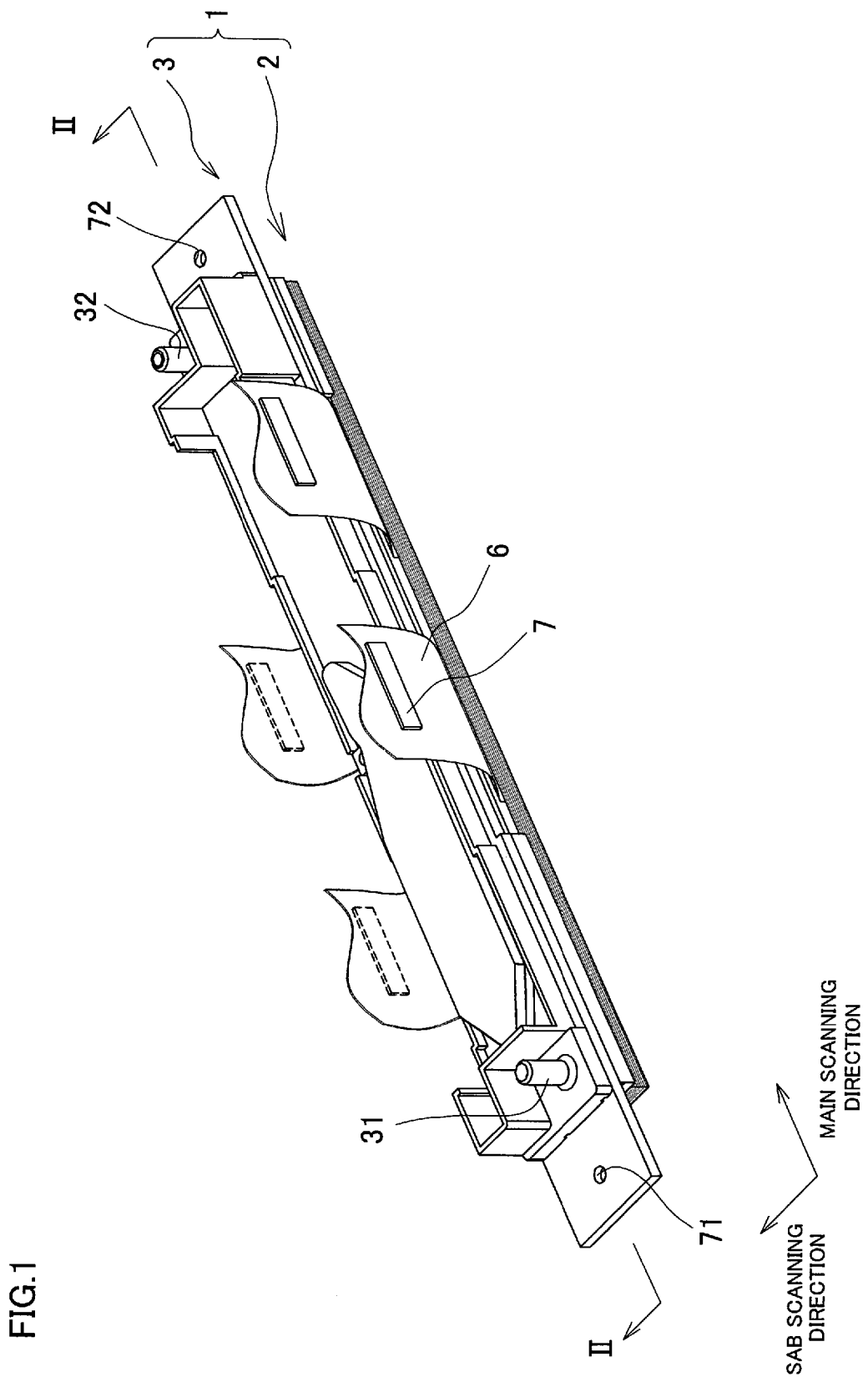
FIG. 1 is a perspective view of an external appearance of an ink-jet head according to an embodiment of the present invention.

FIG. 1 is a perspective view of an external appearance of an ink-jet head according to an embodiment of the present invention. As shown in FIG. 1, an ink-jet head 1 is elongated in a main scanning direction and has, from down to top, a head main body 2 and a reservoir unit 3. The head main body 2 is opposed to a record medium. The reservoir unit 3 temporarily stores ink therein. Four FPCs (Flexible Printed Circuits) 6, which work as power supply members, are put on an upper face of the head main body 2, and extend upward through a space between the head main body 2 and the reservoir unit 3. One end of the FPC 6 is connected to an actuator unit 21 which will be described later, and the other end thereof is connected to a control board (not shown). A driver IC 7 is mounted on the FPC 6 at a point midway from the actuator unit 21 to the control board. That is, the FPC 6 is electrically connected to the control board and the driver IC 7, so that it transmits an image signal outputted from the control board to the driver IC 7 and supplies a drive signal outputted from the driver IC 7 to the actuator unit 21.

Figure 2:
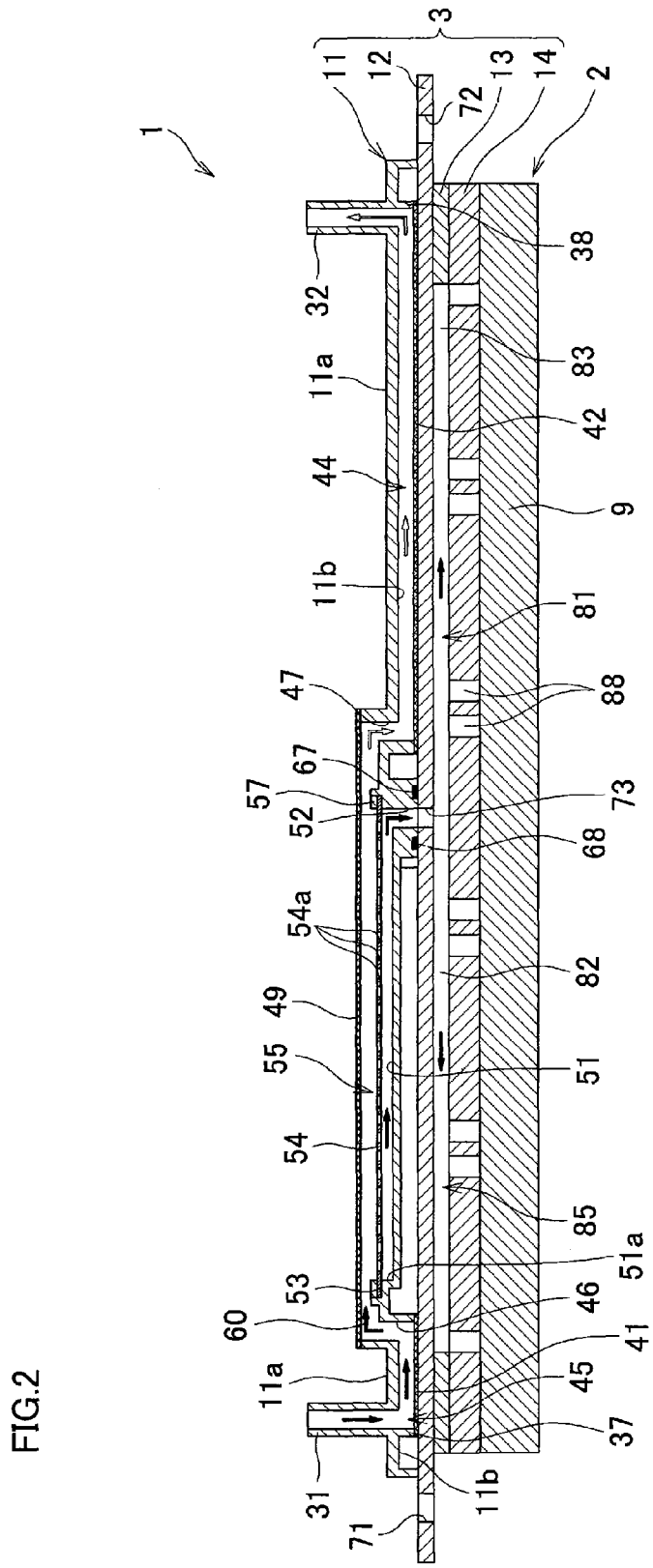
FIG. 2 is a sectional view as taken along a line II-II of FIG. 1.
Figure 3:
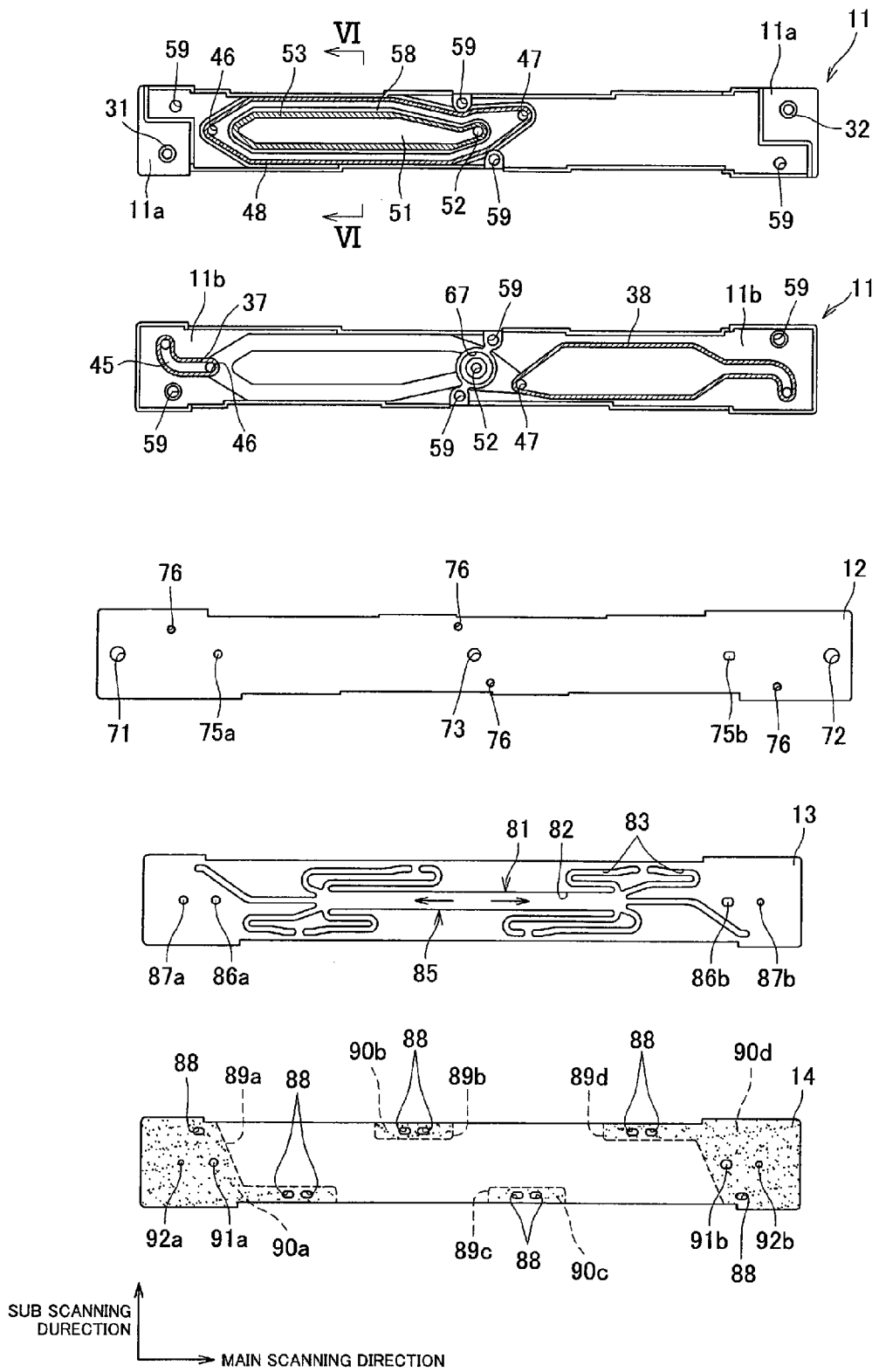
FIG. 3 is a set of exploded plan views of a reservoir unit that is included in the ink-jet head.
Figure 4:
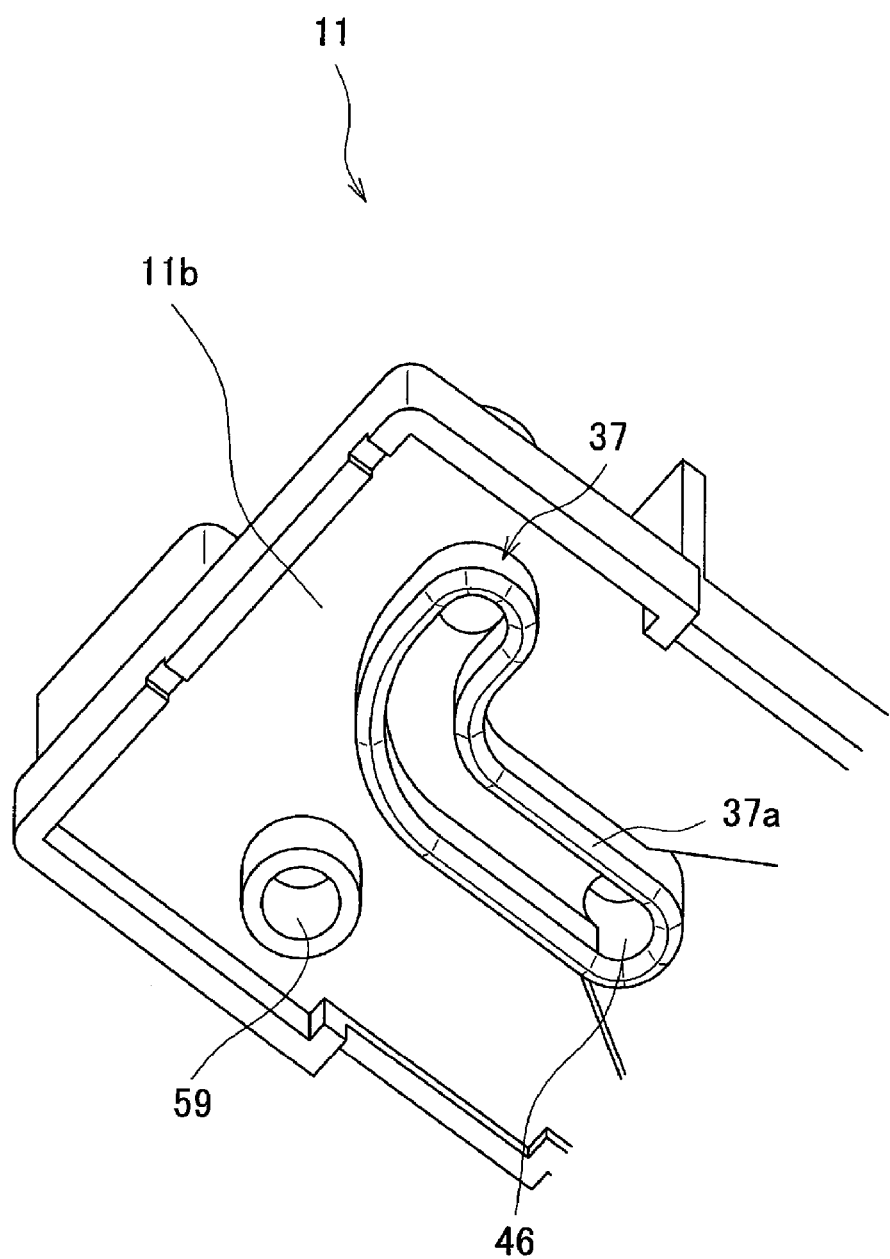
FIG. 4 is a perspective view of a part of a passage component that is included in the reservoir unit, as seen at an angle from below.
Figure 5:
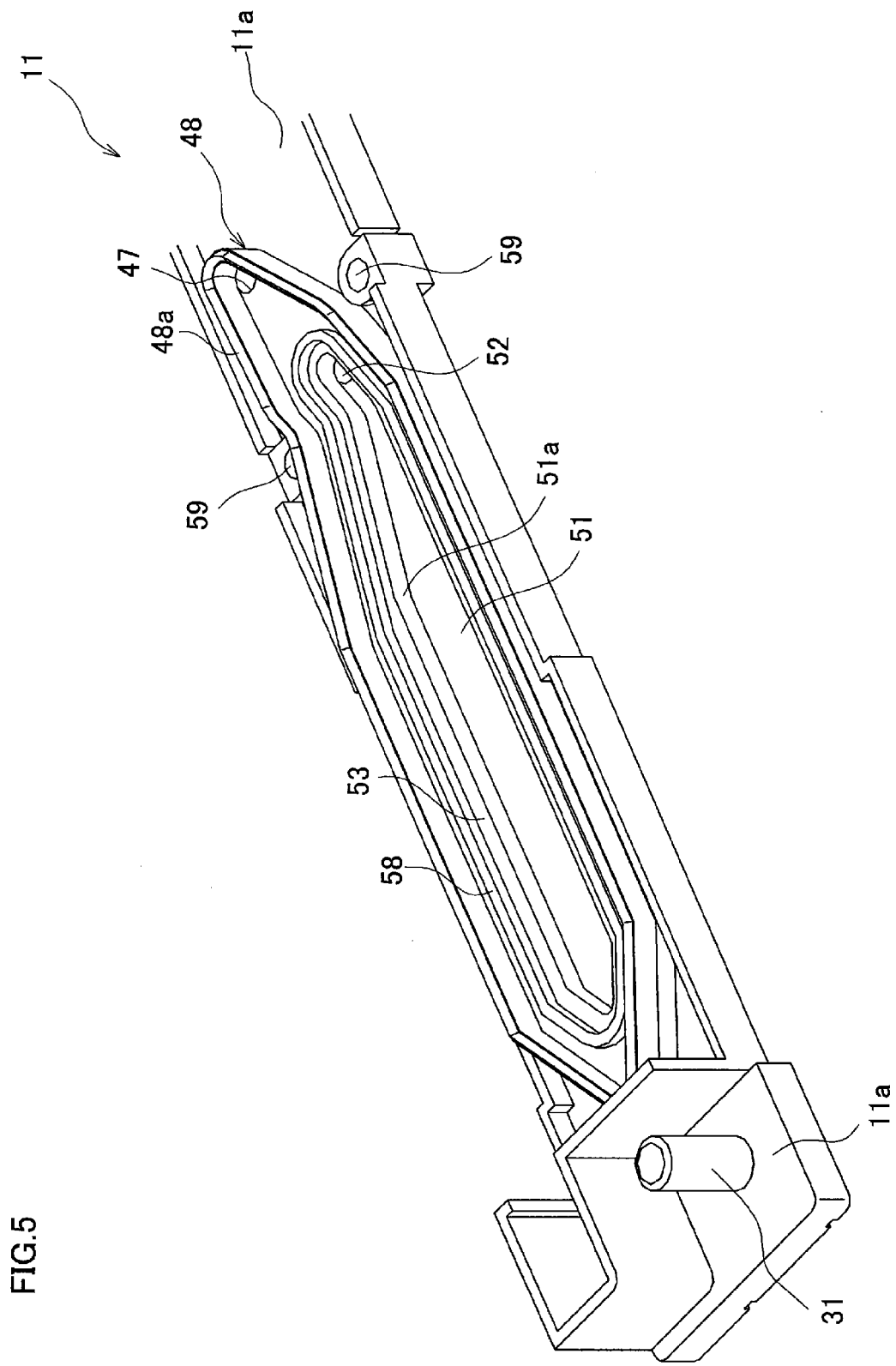
FIG. 5 is a perspective view of a part of the passage component, as seen at an angle from above.
Figure 6:
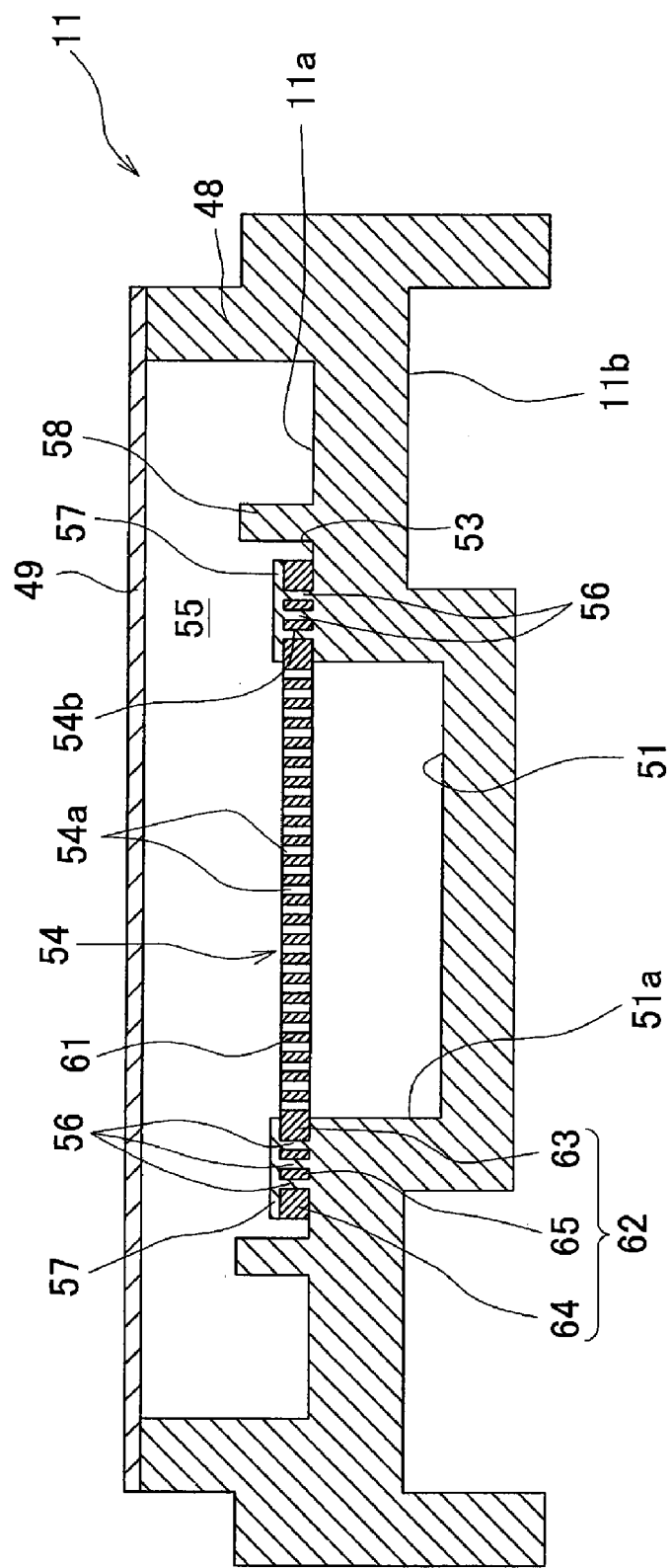
FIG. 6 is a sectional view as taken along a line VI-VI of FIG. 3.

FIG. 2 is a sectional view of the ink-jet head 1. FIG. 3 is a set of exploded plan views of a reservoir unit 3. FIG. 4 is a perspective view of a part of a passage component 11 that is included in the reservoir unit 3, as seen at an angle from below. FIG. 5 is a perspective view of a part of the passage component 11, as seen at an angle from above. FIG. 6 is a sectional view as taken along a line VI-VI of FIG. 3. In FIG. 2, for the purpose of explanatory convenience, the ink-jet head 1 is scaled up in its thickness direction. Besides, an ink passage formed in the reservoir unit 3 is illustrated, although it actually does not appear on a section that is taken along an identical line. Among the views of FIG. 3, the uppermost one is the passage component 11 as seen from above, and the second uppermost one is the passage component 11 as seen from below. In FIGS. 3 to 5, films 41, 42, 49, and a filter plate 54 which are shown in FIG. 2 are omitted for the purpose of easy understanding of a structure of the passage component 11.

The reservoir unit 3 temporarily stores ink therein, and supplies ink to a passage unit 9 which is included in the head main body 2. As shown in FIG. 3, the reservoir unit 3 has a layered structure in which the passage component 11 and three plates 12 to 14 are layered. The passage component 11 is elongated in the main scanning direction. Each of the three plates 12 to 14 has a rectangular plane elongated in the main scanning direction. The passage component 11 is made of a synthetic resin such as a polyethylene terephthalate resin, a polypropylene resin and the like. The plates 12 to 14 are metal plates made of, e.g., SUS430.

As shown in FIGS. 2 and 3, in the vicinity of one longitudinal end and the other longitudinal end of the passage component 11, cylindrical joints 31 and 32 protrude from a surface 11a of the uppermost passage component 11. The joint 31 is fitted into and thus connected to an ink supply tube (not shown). The joint 32 is fitted into and thus connected to an ink discharge tube (not shown).

As shown in FIGS. 3 and 4, annular walls 37 and 38 protrude from a back face 11b of the passage component 11. The annular walls 37 and 38 enclose regions that correspond to the joints 31 and 32, respectively. Both of the annular walls 37 and 38 are opened toward the plate 12. In a plan view, the annular wall 37 curves into an L-shape, from a point corresponding to the joint 31. In a plan view, the annular wall 38 curves into an L-shape, from a point corresponding to the joint 32. A space in the annular wall 38 with respect to a sub scanning direction is increased from the point corresponding to the joint 32, and reduced in the vicinity of a center of the passage component 11. As shown in FIG. 4, a protruding end 37a of the annular wall 37 has a tapered shape. The end 37a of the annular wall 37 is heated and melted through a film 41, so that the annular wall 37 is adhered to the film 41 (see FIG. 2). In the second uppermost view of FIG. 3, a left-side hatched region is a region adhered to the film 41. An opening of the annular wall 37 is thereby sealed, thus forming a space enclosed with the back face 11b, the annular wall 37, and the film 41. That is, a flow-in passage 45 communicating with the joint 31 and a later-described hole 46 is formed.

The end 37a of the annular wall 37 has a tapered shape, and therefore is easily melted when heated. Accordingly, by heating the end 37a of the annular wall 37 through the film 41, the film 41 can easily be adhered to the annular wall 37 while preventing a portion of the annular wall 37 except the end 37a from being melted. Even if the end 37a has an inaccurate flatness, inaccuracy can be compensated because the end 37a is melted down.

Like the end 37a of the annular wall 37, a protruding end of the annular wall 38 has a tapered shape. In the same manner as described above, the protruding end is melted so that the annular wall 38 is adhered to the film 42 (see FIG. 2). In the second uppermost view of FIG. 3, a right-side hatched region is a region adhered to the film 42. An opening of the annular wall 38 is thereby sealed. Thus, in a space enclosed with the back face 11b, the annular wall 38, and the film 42, a discharge passage 44 communicating with the joint 32 and a later-described hole 47 is formed.

As shown in FIG. 2 and in the uppermost and the second uppermost views of FIG. 3, circular holes 46 and 47 are formed on the surface 11a of the passage component 11 and penetrate to the back face 11b. The hole 46 is positioned so as to communicate with a downstream end of the flow-in passage 45. The hole 47 is formed at a position that is a little closer to the joint 32 than the center of the passage component 11 is. The hole 47 is positioned so as to communicate with an upstream end of the discharge passage 44.

As shown in the uppermost view of FIG. 3 and FIG. 5, an annular wall 48 that encloses the hole 46 and the hole 47 protrudes from the surface 11a. In a plan view, a space in the annular wall 48 with respect to the sub scanning direction is increased along a longitudinal direction of the passage component 11 from a vicinity of the hole 46 to a vicinity of both sides of the passage component 11, and then the annular wall 48 extends along the both sides to a vicinity of the center, and then the space is reduced toward the hole 47. As shown in FIG. 5, a protruding end 48a of the annular wall 48 has a tapered shape. The end 48a of the annular wall 48 is heated and melted through a film 49, so that the annular wall 48 is adhered to the film 49 (see FIG. 2). The uppermost view of FIG. 3 shows two annular hatched regions, the external one of which is a region that is adhered to the film 49. The film 49 has flexibility, and its upper face is touched by the atmosphere. The film 49 also works as a damper for damping vibration of ink. An opening of the annular wall 48 is thereby sealed, thus forming a space enclosed with the surface 11a, the annular wall 48, and the film 49. That is, a filter chamber 55 provided therein with a later-described filter plate 54 is formed.

The end 48a of the annular wall 48 has a tapered shape, and therefore is easily melted when heated. Accordingly, by heating the end 48a of the annular wall 48 through the film 49, the film 49 can easily be adhered to the annular wall 48 while preventing a portion of the annular wall 48 except the end 48a from being melted. Even if the end 48a has an inaccurate flatness, inaccuracy can be compensated because the end 48a is melted down.

The films 41, 42, and 49 are made of a material having excellent gas barrier properties such as a PET (polyethylene terephthalate) film on which a silica film (SiOx film), an aluminum film, or the like is vapor-deposited. Thus, gas outside the ink-jet head 1 can hardly enter an ink passage of the passage component 11 through the film 41, 42, and 49.

As shown in FIGS. 2, 5, and 6, a concavity 51 is formed inside the annular wall 48. As shown in the uppermost view of FIG. 3, the concavity 51 extends from a vicinity of the hole 46 to a vicinity of the center of the passage component 11. In a plan view, a shape of the concavity 51 is similar to but slightly smaller than that of the annular wall 48. A circular hole 52 is formed on a bottom face of the concavity 51 and in the vicinity of the center of the passage component 11.

A filter plate 54 (see FIG. 2) is supported on an annular face 53 that encloses the concavity 51. Thus, the annular face functions as a filter support face. The uppermost view of FIG. 3 shows two annular hatched regions, the internal one of which is the annular face 53. An outer edge of the annular face 53 is defined by an annular wall 58 that is protrudingly formed along an outer edge of the filter plate 54. A height of the annular wall 58 is lower than a height of the annular wall 48 that defines the filter chamber 55.

Figure 7A:
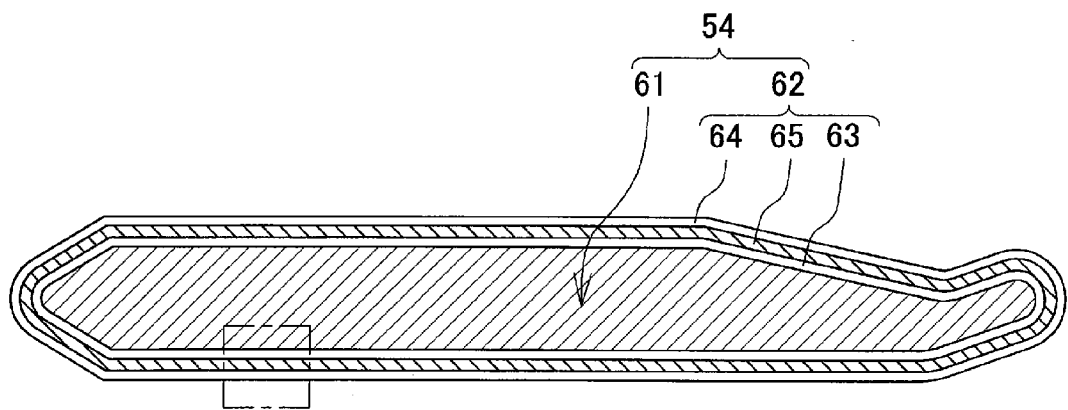
FIG. 7A is a plan view of a filter plate.

Here, the filter plate 54 will be described with reference to FIGS. 7A and 7B.

In a plan view, a shape of the filter plate 54 is similar to but slightly larger than that of the concavity 51. The filter plate 54 is made of nickel manufactured through an electroforming process for example, and has a melting point higher than a melting point of the passage component 11. The filter plate 54 has an inner region 61 that is opposed to the concavity 51, and an annular region 62 that is opposed to the annular face 53 and surrounds the inner region 61. Many fine holes 54a through which ink is filtered are formed in the inner region 61. The annular region 62 includes a first non-pieced area 63, a second non-pierced area 64, and an intermediate area 65. The first non-pierced area 63 is adjacent to an outer edge of the inner region 61, and has no through hole formed therein. The second non-pierced area 64 is continuous with the outer edge of the filter plate 54, and has no through hole formed therein. The intermediate area 65 is formed between the non-pierced areas 63 and 64. Many holes 54b are formed in the intermediate area 65. That is, the holes 54a and 54b are formed in hatched regions in FIG. 7A.

Figure 7B:
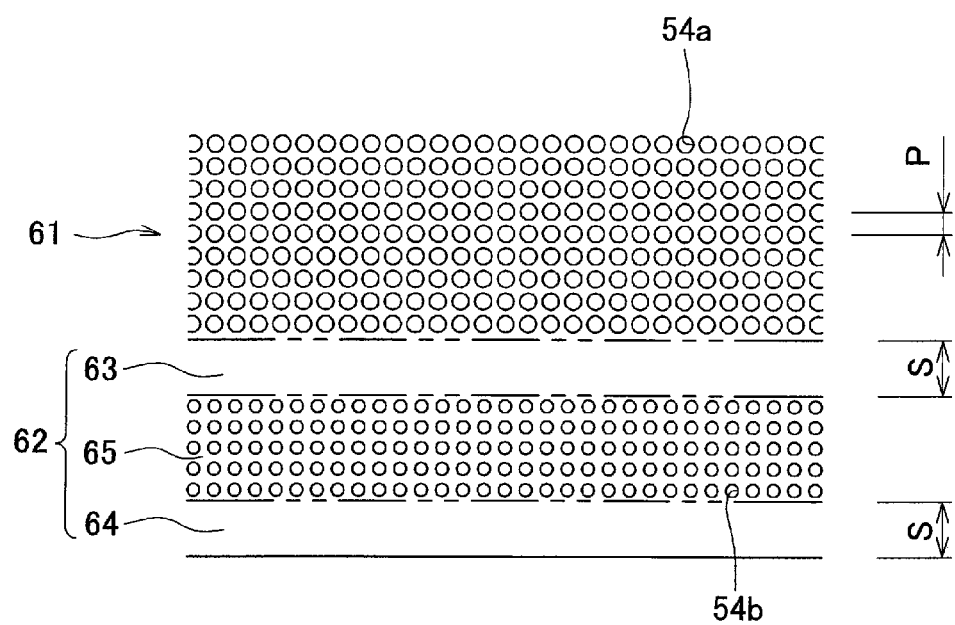
FIG. 7B is an enlarged plan view of a region that is, in FIG. 7A, enclosed with an alternate long and short dash line.

As shown in FIG. 7B, the non-pierced areas 63 and 64 have the same width S. The width S is larger than a pitch P between the holes 54a that are formed in the inner region 61. In this embodiment, a diameter of the hole 54a formed in the inner region 61 is larger than a diameter of the hole 54b formed in the intermediate area 65. However, a diameter of the hole 54a may not be larger than a diameter of the hole 54b.

Referring to FIG. 6 again, the filter plate 54 is disposed on the annular face 53 in such a manner that the non-pierced area 63 locates in a plane-direction extension of an inner surface 51a of a side wall of the concavity 51. The inner surface 51a is continuous with an inner circumferential border of the annular face 53, and extends in a direction perpendicular to the annular face 53. Therefore, the inner region 61 of the filter plate 54 is entirely opposed to the concavity 51, and the non-pierced region 64 and the intermediate region 65 of the annular region 62 are entirely opposed to the annular face 53, and the non-pierced region 63 is partially opposed to the annular face 53. In other words, the annular face 53 is in contact with the annular region 62 of the filter plate 54, but out of contact with the inner region 61.

Many radially-expanding protrusions 56 are formed on the annular face 53. The radially-expanding protrusions 56 are embedded in the respective holes 54b of the intermediate area 65. Beyond the hole 54b and on an upper face of the filter plate 54, the protrusion 54 radially expands so that its diameter is larger than a diameter of the hole 54. Portions of the radially-expending protrusions 56 beyond the holes 54b are connected and integrated with each other, thus forming a resin layer 57. The resin layer 57 is formed throughout, among an upper face of the annular region 62, an area corresponding to the annular face 53. Thus, in a plan view, the resin layer 57 has an annular shape. The width of the non-pierced area 63 is set such that the resin layer 57 does not spread to the inner region 61. Thus, filtration properties of the filter plate 54 are not spoiled.

In a plan view, a shape of the annular wall 58 is similar to and a slightly larger than the shape of the filter plate 54. The annular wall 58 encloses the filter plate 54 at a distance from the filter plate 54. A level of the annular wall 58 is higher than a level of the upper face of the filter plate 54. Thus, the annular wall 58 functions as a guide when the filter plate 54 is disposed, to allow the filter plate 54 to be easily disposed on the annular face 53. In this way, the filter plate 54 is fixed within the filter chamber 55 of the passage component 11.

The diameter of the hole 54b formed in the intermediate area 65 is smaller than the diameter of the hole 54a formed in the inner region 61. Consequently, even when the hole 54b is not closed with the radially-expanding protrusion 56 but is connected to the hole 54a in parallel through a bypass passage, the hole 54b does not permit any foreign matter having a size equal to or larger than a size permitted through the hole 54a because of a size relationship. That is, in the present invention, it is not necessary that all the holes 54b are closed with the radially-expanding protrusions 56.

Referring to FIG. 2 again, a curved passage 60 is formed in the passage component 11. The curved passage 60 extends from the hole 46 to the hole 52 through the filter chamber 55 and a space formed within the concavity 51. The curved passage 60 is connected also to the discharge passage 44 via the hole 47. On a lower face of the passage component 11, an annular groove 67 that opens downward is formed around the hole 52. An O-ring 68 is fitted in the annular groove 67.

As shown in FIG. 3, the passage component 11 has four circular holes 59 passing therethrough from the surface 11a to the back face 11b. Two of the holes 59 locate in a middle portion of the passage component 11 and two of them locate at both end portions of the passage component 11, with respect to the longitudinal direction of the passage component 11. The holes 59 are arranged point-symmetrically with respect to the center of the passage component 11.

As shown in FIGS. 2 and 3, circular holes 71 and 72 are formed at both longitudinal end portions of the plate 12 which is disposed just under the passage component 11. The holes 71 and 72 are used for fixing the ink-jet head 1 to a printer main body by use of screws or the like. The plate 12 has a circular hole 73 at its center, and positioning holes 75a and 75b at its portion that is a little closer to the center than the holes 71 and 72 are. The plate 12 further has four screw holes 76. Two of the screw holes 76 locate in a middle portion of the plate 12 and two of them locate at both end portions of the plate 12, with respect to the longitudinal direction of the plate 12. The screw holes 76 are arranged point-symmetrically with respect to the center of the plate 12. The screw holes 76 correspond to the above-described holes 59, respectively. By putting screws into the respective holes 59 and further screwing them into the screw holes 76 of the plate 12, the passage component 11 and the plate 12 are fixed to each other. At this time, the hole 52 of the passage component 11 and the hole 73 of the plate 12 are opposed to each other so that the curved passage 60 of the passage component 11 communicates with the hole 73. Since the O-ring 68 is fitted in the annular groove 67, ink does not leak out at an outlet of the curved passage 60 into between the passage component 11 and the plate 12.

As shown in FIGS. 2 and 3, a plate 13 which is disposed immediately under the plate 12, has a through hole 81. The through hole 81 forms a reservoir passage 85 that includes a main passage 82 and ten branch passages 83 communicating with the main passage 82. In a plan view, the reservoir passage 85 is point-symmetrical with respect to a center of the plate 13. The main passage 82 extends along a longitudinal direction of the plate 13. Substantially a center of the main passage 82 corresponds to the hole 73 of the plate 12. A passage width of the branch passage 83 is smaller than a passage width of the main passage 82. All of the branch passages 83 have the same passage width, the same passage length, and substantially the same passage resistance. The plate 13 further has positioning holes 86a and 86b that correspond to the positioning holes 75a and 75b of the plate 12, respectively, and positioning holes 87a and 87b that are for positioning the plate 13 with a plate 14.

As shown in FIGS. 2 and 3, the lowermost plate 14 of the reservoir unit 3 has ink discharge holes 88 each having an elliptical shape. The ink discharge holes 88 are formed at positions corresponding to ends of the respective branch passages 83. The plate 14 further has four positioning holes 91a, 91b, 92a, and 92b corresponding to the positioning holes 86a, 86b, 87a, and 87b of the plate 13, respectively.

On a lower face of the plate 14, portions hatched in FIG. 3 protrude downward, to form protrusions 89a, 89b, 89c, and 89d. Each of the protrusions 89a, 89b, 89c, and 89d covers two or three ink discharge holes 88, and is fixed to an upper face of the passage unit 9 via a filter plate 95a or 95b (see FIG. 8). A portion of the plate 14 other than the protrusions 89a to 89d is spaced apart from the passage unit 9, so that a space is formed. The FPCs 6 (see FIG. 1) extend through the space.

By positioning pins (not shown) being inserted into the positioning holes 75a, 75b, 86a, 86b, 87a, 87b, 91a, 91b, 92a, and 92b, the three plates 12 to 14 are positioned with one another, and fixed by an adhesive. Thus, the reservoir unit 3 having the passage component 11 and the three plates 12 to 14 layered on one another is formed.

Next, a description will be given to how ink flows within the reservoir unit 3. Within the reservoir unit 3, the flow-in passage 45, the curved passage 60, the filter chamber 55, and the reservoir passage 85 are formed. Ink is temporarily stored in the reservoir unit 3.

As indicated by black arrows in FIG. 2, ink that has flown through the joint 31 into the passage component 11 flows horizontally through the flow-in passage 45, and then flows upward through the hole 46, and then flows into the curved passage 60. In a case where the joint 32 is opened, some of the ink that has flown into the curved passage 60 flows through the hole 47 into the discharge passage 44 and then into the joint 32. At an initial stage of introducing ink for example, by discharging ink from the joint 32, air existing on an upper face of the filter plate 54 is also discharged together with the ink, so that fresh ink is charged on an upstream side of the filter plate 54.

The ink that has flown into the filter chamber 55 passes through the holes 54a of the filter plate 54, and falls into the concavity 51. The ink that has fallen into the concavity 51 passes through the holes 52 and 73, and falls into the reservoir passage 85. Then, the ink flows from the center of the main passage 82 toward both longitudinal ends of the main passage 82, as indicated by arrows in the fourth view from the top of FIG. 3. The ink reaches the both longitudinal ends of the main passage 82, and flows into the respective branch passages 83. The ink that has flown into the respective branch passages 83 passes through the ink discharge holes 88 and holes (not shown) formed in the filter plates 95a and 95b, and then flows through ink supply ports 101 into the passage unit 9.

The ink that has flown into the passage unit 9 is, as will be described later, distributed to many individual ink passages 132 (see FIG. 10) that communicate with manifold channels 105. The ink then reaches nozzles 108 which are terminals of the respective individual ink passages 132, and then ejected to outside.

Figure 9:
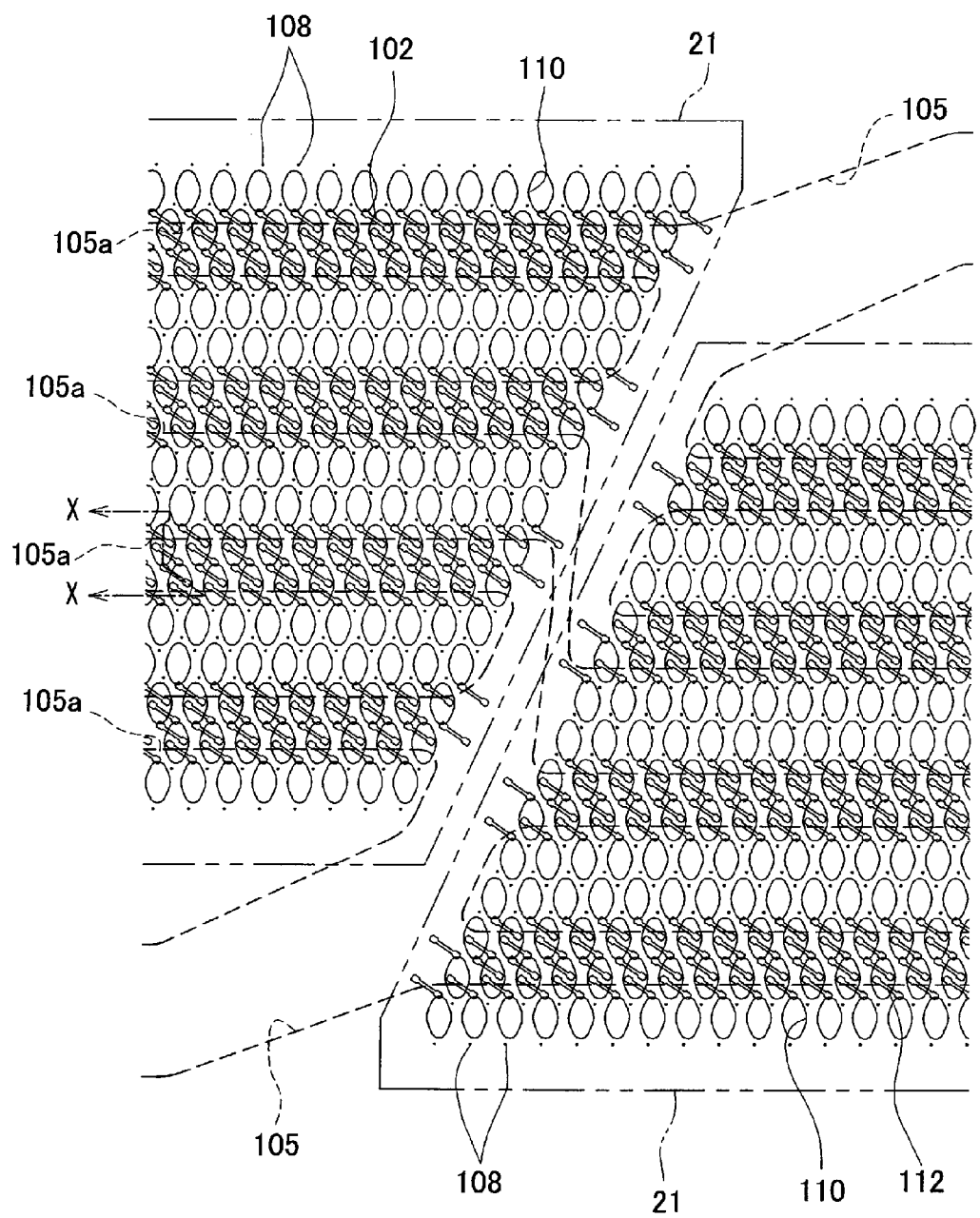
FIG. 9 is an enlarged view of a region that is, in FIG. 8, enclosed with an alternate long and short dash line.
Figure 10:
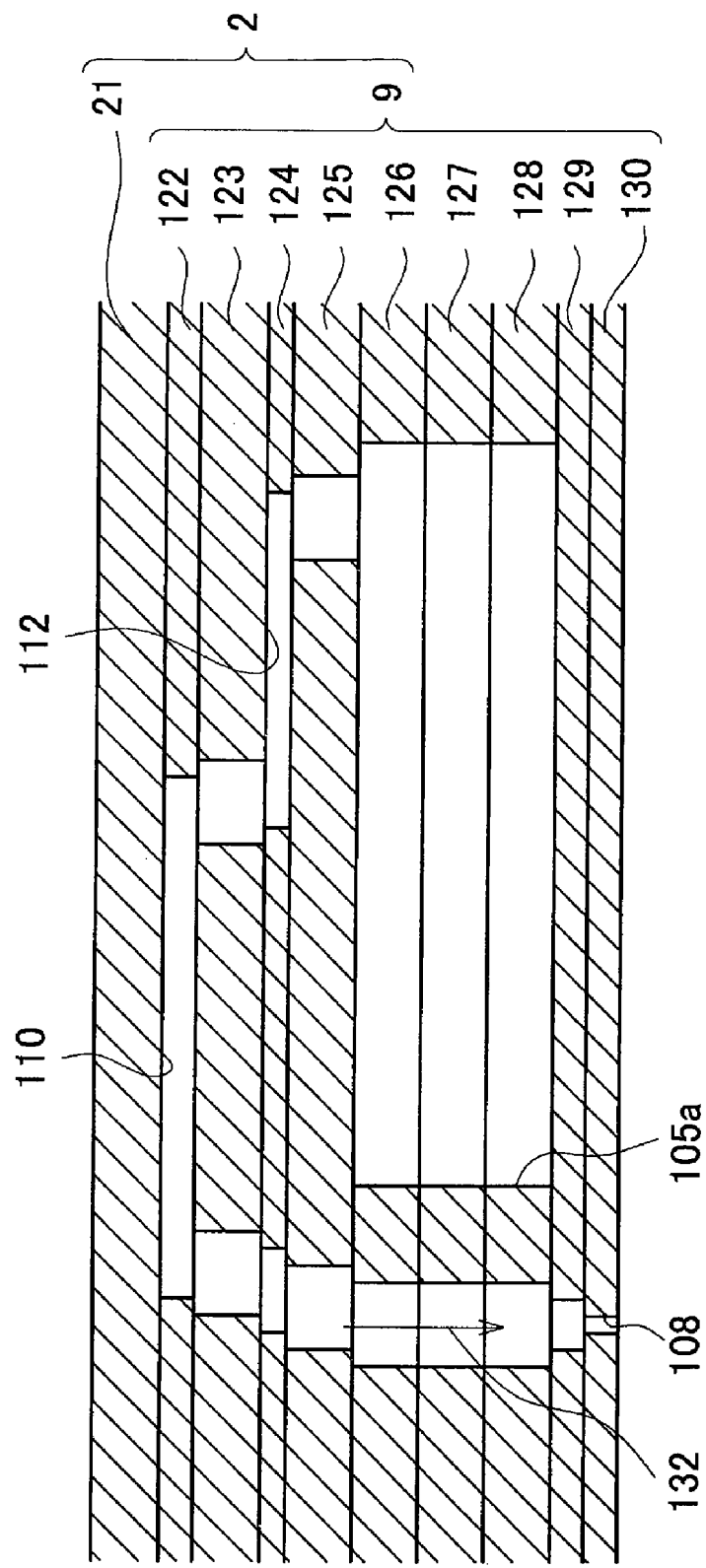
FIG. 10 is a local sectional view as taken along a line X-X of FIG. 9.
Figure 11A:
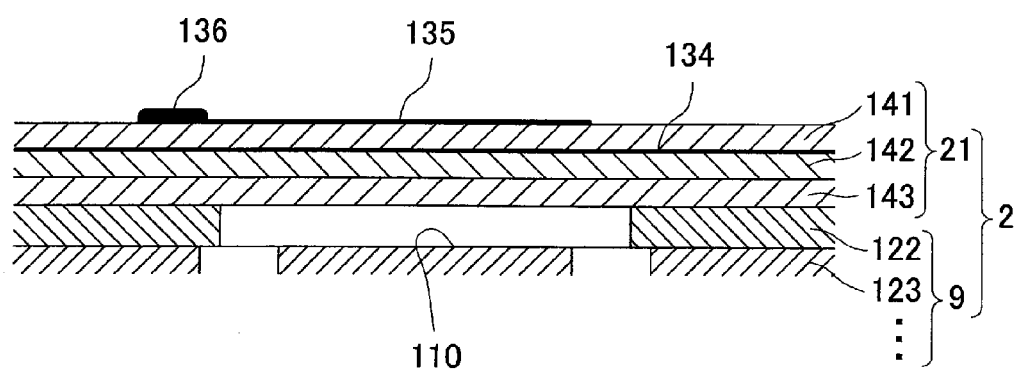
FIG. 11A is an enlarged sectional view of an actuator unit.
Figure 11B:
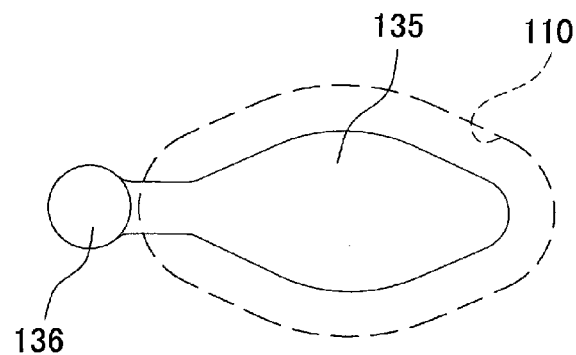
FIG. 11B is a plan view of an individual electrode that is disposed on a surface of the actuator unit.

Next, the head main body 2 will be described with reference to FIGS. 8 to 11. FIG. 8 is a plan view of the head main body 2. FIG. 9 is an enlarged view of a region that is, in FIG. 8, enclosed with an alternate long and short dash line. In FIG. 9, for the purpose of explanatory convenience, pressure chambers 110, apertures 112, and nozzles 108 are illustrated with solid lines although they locate below the actuator units 21 and therefore should actually be illustrated with broken lines. FIG. 10 is a local sectional view as taken along a line X-X of FIG. 9. FIG. 11A is an enlarged sectional view of the actuator unit 21, and FIG. 11B is a plan view of an individual electrode 135 that is disposed on a surface of the actuator unit 21.

As shown in FIG. 8, the head main body 2 includes the passage unit 9 and four actuator units 21 that are fixed on the upper face of the passage unit 9. The actuator unit 21 includes actuators each corresponding to each pressure chamber 110, and has a function of selectively applying ejection energy to ink contained within the pressure chambers 110 that are formed on the passage unit 9.

An outer shape of the passage unit 9 is a substantially rectangular parallelepiped shape having substantially the same width as that of the reservoir unit 3. A length of the passage unit 9 with respect to the main scanning direction is slightly smaller than that of the reservoir unit 3. As shown in FIGS. 9 and 10, a lower face of the passage unit 9 is an ink ejection face in which many nozzles 108 are arranged in a matrix. Portions of the ink ejection face which correspond to portions where the actuator units 21 are bonded are ink ejection regions. On the upper face of the passage unit 9, many pressure chambers 110 are formed in a matrix like the nozzles 108. Formed within the passage unit 9 are many individual ink passages 132 each corresponding to each pressure chamber 110 and each nozzle 108.

Positioning holes 102a and 102b corresponding to the positioning holes 87a, 87b, 92a, and 92b of the plates 13 and 14 are formed at both longitudinal ends of the passage unit 9. By putting positioning pins through the positioning holes 87a, 87b, 92a, 92b, 102a and 102b, the passage unit 9 and the reservoir unit 3 are positioned with each other.

As shown in FIG. 10, the passage unit 9 has nine plates of, from the top, a cavity plate 122, a base plate 123, an aperture plate 124, a supply plate 125, manifold plates 126, 127, 128, a cover plate 129, and a nozzle plate 130. Each of the plates 122 to 130 is, like the plates 12 to 14 of the reservoir unit 3, made of SUS430 for example and, in a plan view, has a rectangular shape elongated in the main scanning direction (see FIG. 1).

Formed in the cavity plate 122 are through holes serving as the ink supply ports 101 (see FIG. 8) and many substantially rhombic through holes serving as the pressure chambers 110. Formed in the base plate 123 are communication holes each provided for each pressure chamber 110 so as to connect a pressure chamber 110 to an aperture 112, and communication holes each provided for each pressure chamber 110 so as to connect a pressure chamber 110 to a nozzle 108. Also formed in the base plate 123 are communication holes each connecting an ink supply port 101 to a manifold channel 105. Formed in the aperture plate 124 are through holes each provided for each pressure chamber 110 and serving as an aperture 112, and communication holes each provided for each pressure chamber 110 so as to connect a pressure chamber 110 to a nozzle 108. Also formed in the aperture plate 124 are communication holes each connecting an ink supply port 101 to a manifold channel 105. Formed in the supply plate 125 are communication holes each provided for each pressure chamber 110 so as to connect an aperture 112 to a sub manifold channel 105a, and communication holes each provided for each pressure chamber 110 so as to connect each pressure chamber 110 to a nozzle 108. Also formed in the supply plate 125 are communication holes each connecting an ink supply port 101 to a manifold channel 105. Formed in the manifold plates 126, 127, and 128 are communication holes each provided for each pressure chamber 110 so as to connect a pressure chamber 110 to a nozzle 108. Also formed in the manifold plates 126, 127, and 128 are through holes that cooperate with each other to constitute manifold channels 105 or sub manifold channels 105a when the plates are put in layers. Formed in the cover plate 129 are communication holes each provided for each pressure chamber 110 so as to connect a pressure chamber 110 to a nozzle 108. Formed in the nozzle plate 130 are through holes each provided for each pressure chamber 110 and serving as each nozzle 108.

The nine plates 122 to 130 are positioned, put in layers, and fixed to one another so that an individual ink passage 132 as shown in FIG. 10 is formed inside the passage unit 9.

As shown in FIG. 8, a total of ten ink supply ports 101 are opened on the upper face of the passage unit 9. The ten ink supply ports 101 correspond to the ink discharge holes 88 of the reservoir unit 3 (see the lowermost view of FIG. 3). Manifold channels 105 that communicate with the ink supply ports 101, and sub manifold channels 105a that branch from the manifold channels 105 are formed within the passage unit 9. Individual ink passages 132 are provided for the respective nozzles 108. As shown in FIG. 8, each of the individual ink passages 132 extends from a manifold channel 105 to a nozzle 108 through a sub manifold channel 105a, an outlet of the sub manifold channel 105a, an aperture 112, and a pressure chamber 110. Ink is supplied from the reservoir unit 3 through the ink supply ports 101 into the passage unit 9, and then branches from the manifold channels 105 into the sub manifold channels 105a, and then goes through the apertures 112 which function as throttles and the pressure chambers 110 to the nozzles 108.

The filter plates 95a and 95b that cover the ink supply ports 101 are disposed on the upper face of the passage unit 9. Each of the two filter plates 95a extends obliquely with respect to a widthwise direction of the passage unit 9, so as to cover the ink supply ports 101 that locate at each longitudinal end portion of the passage unit 9. Each of the four filter plates 95b has a shape elongated in a longitudinal direction of the passage unit 9. The ink supply ports 101 are paired and arranged in a zigzag pattern along the longitudinal direction of the passage unit 9. The four filter plates 95b are disposed so that each of them covers two of the ink supply ports 101. The filter plates 95a and 95b are disposed in regions to which the protrusions 89a to 89d (as illustrated with alternate long and two short dashes lines in FIG. 8) of the plate 14 of the reservoir unit 3 are fixed. By an adhesive, the filter plates 95a and 95b are bonded to portions of lower faces of the protrusions 89a to 89d except the ink discharge holes 88. Portions of the lower faces of the protrusions 89a to 89d which are not opposed to the filter plates 95a and 95b are bonded to the upper face of the passage unit 9 by an adhesive.

As shown in FIG. 8, the four actuator units 21 each having a trapezoidal shape in a plan view are arranged in a zigzag pattern so as to keep out from the ink supply ports 101 and the filter plates 95a, 95b. Parallel opposed sides of each actuator unit 21 extend along the longitudinal direction of the passage unit 9. Oblique sides of every neighboring actuator units 21 overlap each other with respect to the widthwise direction of the passage unit 9. Neighboring actuator units 21 locate equidistantly on opposite sides of a widthwise center of the passage unit 9.

As described above, the reservoir unit 3 is fixed to the passage unit 9 with the protrusions 89a to 89d therebetween. The portion of the lower face of the reservoir unit 3 other than the protrusions 89a to 89d (which is not hatched in the lowermost view of FIG. 3) is spaced apart from the passage unit 9 at an interval corresponding to a protruding height of the protrusions 89a to 89d. The actuator units 21 are fixed to portions of the upper face 9a of the passage unit 9 which are spaced apart from and opposed to the lower face of the reservoir unit 3. The FPCs 6 fixed on the actuator units 21 are not in contact with the lower face of the reservoir unit 3.

As shown in FIG. 11A, the actuator unit 21 includes three piezoelectric sheets 141, 142, and 143 each having a thickness of approximately 15 μm and made of, for example, a lead zirconate titanate (PZT)-base ceramic material with ferroelectricity. The piezoelectric sheets 141 to 143 are disposed so as to extend over many pressure chambers 110 that correspond to one ink ejection face.

On the uppermost piezoelectric sheet 141, individual electrodes 135 are formed at positions corresponding to the respective pressure chambers 110. A common electrode 134 having a thickness of approximately 2 μm is interposed between the uppermost piezoelectric sheet 141 and the piezoelectric sheet 142 disposed under the uppermost piezoelectric sheet 141. The common electrode 134 is formed over entire surfaces of the sheets. Both of the individual electrodes 135 and the common electrode 134 are made of an Ag-Pd-base metallic material for example. No electrode is disposed between the piezoelectric sheets 142 and 143.

The individual electrode 135 has a thickness of approximately 1 μm. In a plan view, as shown in FIG. 11B, the individual electrode 135 has a substantially rhombic shape similar to that of the pressure chamber 110. One acute portion of the individual electrode 135 extends out. Formed at an end of the acute portion is a circular land 136 having a diameter of approximately 160 μm and electrically connected to the individual electrode 135. The land 136 is made of gold including glass frits, for example. As shown in FIG. 11A, the land 136 is, at a predetermined position on an extending-out portion of the individual electrode 135, electrically bonded to a contact that is provided on the FPC 6 (see FIG. 1). The position is, with respect to a thickness direction of the piezoelectric sheets 141 to 143, opposed to a wall of the cavity plate 122 defining the pressure chambers 110. That is, the position does not overlap the pressure chamber 110 with respect to the thickness direction of the piezoelectric sheets 141 to 143.

In a region not illustrated, the common electrode 134 is grounded. Thus, the common electrode 134 is, at its portions corresponding to all the pressure chambers 110, equally kept at the ground potential. In order that potentials of the respective individual electrodes 135 can selectively be controlled, the FPC 6 through which the individual electrodes 135 are connected to the driver IC 7 (see FIG. 1) includes lead wires that are provided for the respective individual electrodes 135 independently of one another. That is, a portion of the actuator unit 21 sandwiched between each individual electrode 135 and the pressure chamber 110 works as an individual actuator. The number of actuators included in the actuator unit 21 equals the number of pressure chambers 110.

Here, a driving mode of the actuator unit 21 will be described. The piezoelectric sheet 141 is polarized in its thickness direction. When the individual electrode 135 is set at a potential different from a potential of the common electrode 134, an electric field in a polarization direction is applied to the piezoelectric sheet 141. As a result, a portion of the piezoelectric sheet 141 to which the electric field is applied acts as an active portion which is distorted by a piezoelectric effect. That is, the piezoelectric sheet 141 extends or contracts in its thickness direction, and contracts or extends in a plane direction by a transversal piezoelectric effect. The other two piezoelectric sheets 142 and 143 form inactive layers not including a region sandwiched between the individual electrode 135 and the common electrode 134, and therefore cannot deform by themselves. That is, the actuator unit 21 is of so-called unimorph type, in which upper one piezoelectric sheet 141 distant from the pressure chambers 110 is a layer including active portions and the lower two piezoelectric sheet 142 and 143 closer to the pressure chambers 110 are layers including no active portions.

As shown in FIG. 11A, the piezoelectric sheets 141 to 143 are fixed on an upper face of the cavity plate 122 that partitions the pressure chambers 110. When difference occurs between plane-direction distortion of a portion of the piezoelectric sheet 141 to which the electric field is applied and plane-direction distortion of the lower piezoelectric sheets 142 and 143, the piezoelectric sheets 141 to 143 as a whole are deformed to protrude toward the pressure chamber 110 (unimorph deformation). This reduces the volume of the pressure chamber 110. Pressure inside the pressure chamber 110 rises accordingly, and ink is pushed out of the pressure chamber 110 to the nozzle 108 and then ejected from the nozzle 108. Thereafter, when the individual electrode 135 is set at the same potential as the potential of the common electrode 134, the piezoelectric sheets 141 to 143 restore the original flat shape, and the volume of the pressure chamber 110 is also returned to the original one. Ink is accordingly introduced from the manifold channel 105 into the pressure chamber 110, and thus the pressure chamber 110 is charged with ink again.

Figure 12:
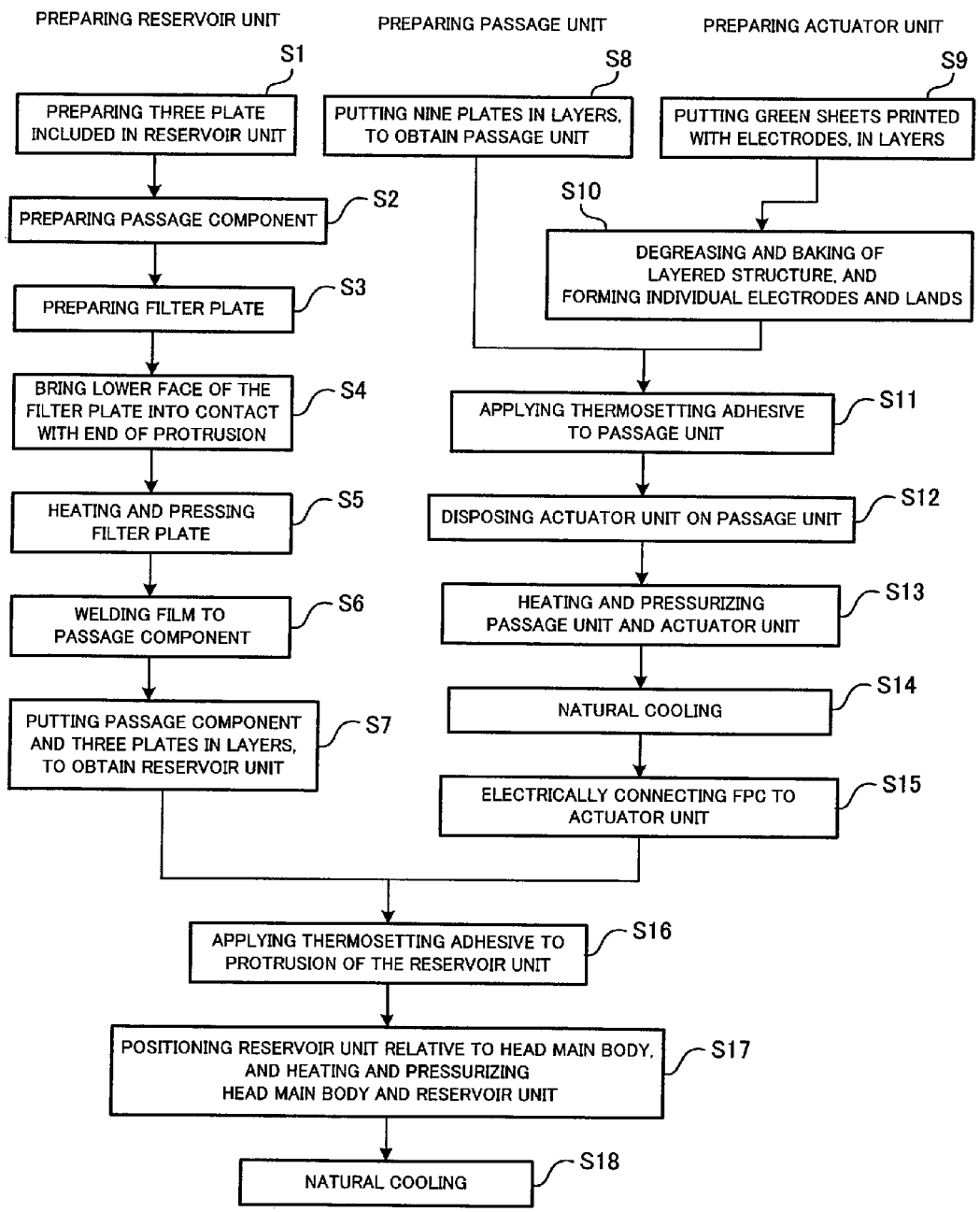
FIG. 12 is a flow diagram showing a process of manufacturing the ink-jet head.
Figure 13:
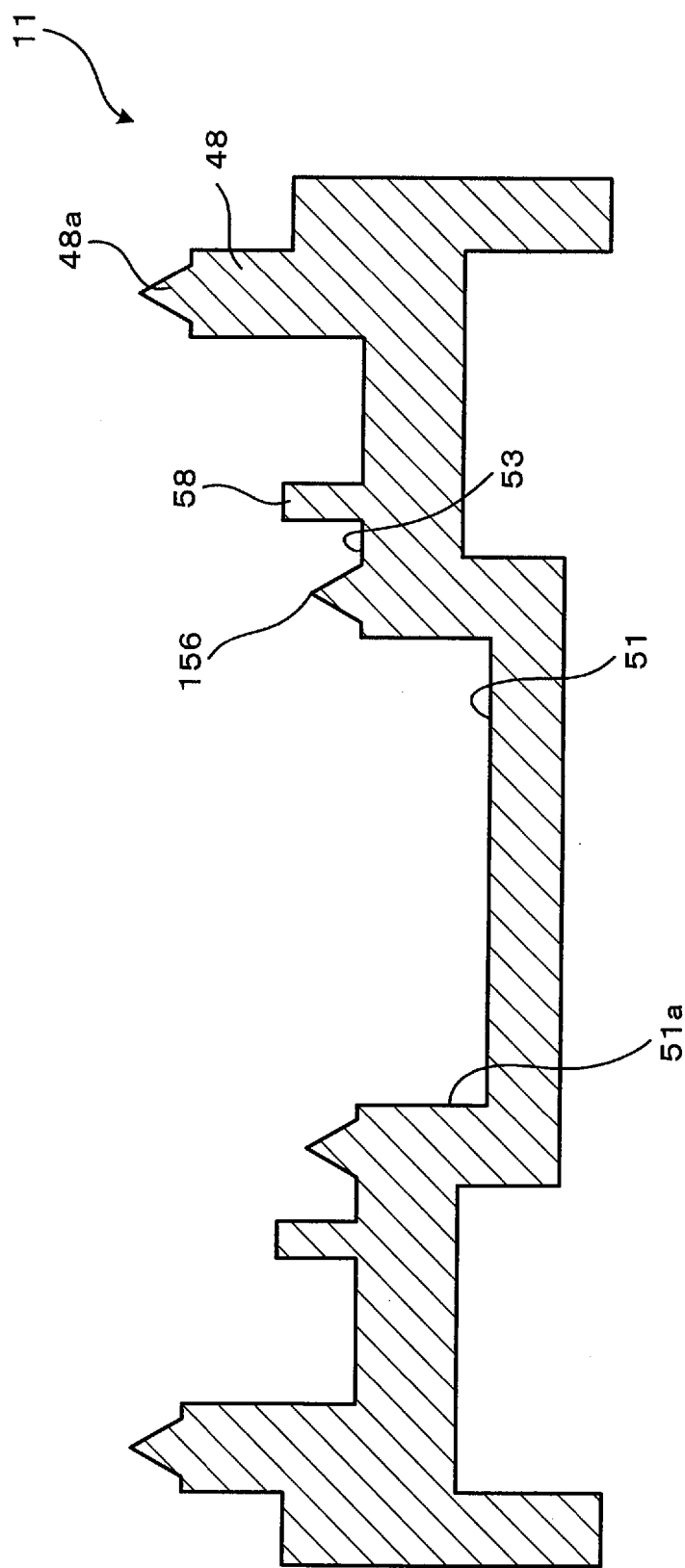
FIG. 13 is a sectional view of a passage component that is manufactured in a step S2 of FIG. 12.

Next, a method of manufacturing the ink-jet head 1 will be described with reference to FIGS. 12 to 14. FIG. 12 is a flow diagram showing a process of manufacturing the ink-jet head 1. In FIG. 2 and in the following description, a step is referred to as an abbreviated designation "S". FIG. 13 is a sectional view of the passage component 11 that is manufactured in S2 of FIG. 12. FIGS. 14A, 14B, and 14C are views explanatory of procedures for fixing the filter plate 54 to the passage component 11. To manufacture the ink-jet head 1, respective parts such as the reservoir unit 3, the passage unit 9, and the actuator unit 21 are separately prepared, and then the parts are assembled to each other.

To prepare the reservoir unit 3, as shown in FIG. 12, the plates 12 to 14 are first prepared (S1). At this time, three plates intended to form a part of the reservoir unit 3 are subjected to an etching process using a patterned photoresist as a mask, so that holes shown in the third to fifth views from the top in FIG. 3 are formed in the respective plates. Then, the passage component 11 made of resin is prepared by a known molding method (S2: passage component preparation step). In the passage component 11, as shown in FIG. 13, a tapered protrusion 156 is formed on the annular face 53. The protrusion 156 is formed annularly over an entire circumference of the annular face 53. Parts of the passage component 11 except the filter plate 54 and the films 41, 42, and 49 are integrally formed. At this time, the protruding ends 37a, 38a, and 48a of the annular walls 37, 38, and 48 to which the films 41, 42, and 49 are welded are formed into tapered shapes. The holes and the like of the passage component 11 are formed at the time when the passage component 11 is formed, by a known molding method such as an injection molding.

Then, a filter plate 54 made of nickel is prepared by a known electroforming process by use of a mask having an inverse pattern of a pattern of the filter plate 54, that is, by use of a resist layer (S3: filter plate preparation step).

Figure 14A:
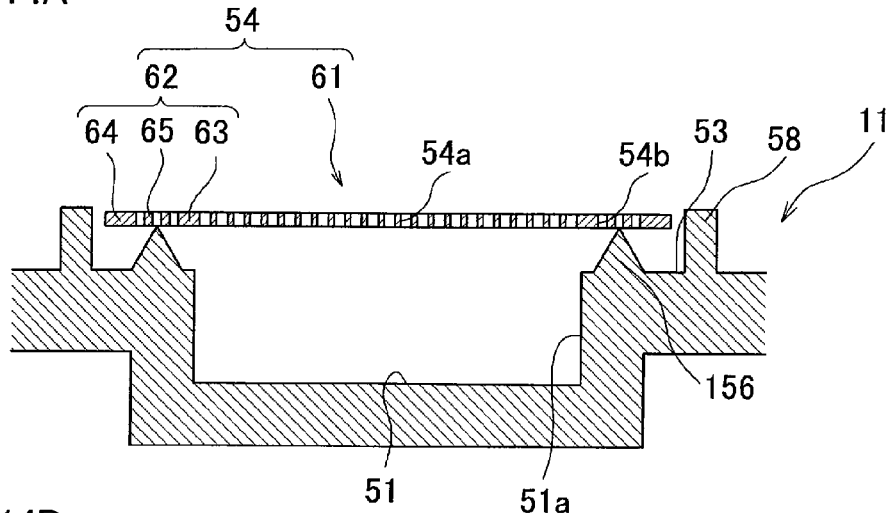
FIGS. 14A, 14B, and 14C are views explanatory of procedures for fixing the filter plate to the passage component.

Then, as shown in FIG. 14A, the intermediate area 65 of a lower face of the filter plate 54 is brought into contact with an end of the protrusion 156 (S4: contact step). At this time, the inner region 61 of the filter plate 54 is opposed to the concavity 51 of the passage component 11, while the non-pierced area 63 of the filter plate 54 is opposed to the inner circumferential border of the annular face 53 which is defined by the inner surface 51a. In this condition, the non-pierced area 63 and the inner circumferential border of the annular face 53 are in contact with each other. This can prevent stress concentration, which occurs on the filter plate 54 when ink passes through the filter plate 54, from occurring in the inner region 61. A life of the filter plate 54 is elongated accordingly.

The level of the annular wall 58 is slightly higher than the level of the upper face of the filter plate 54 put on the protrusion 156. Thus, the annular wall 58 functions as a guide when the filter plate 54 is disposed, to allow the filter plate 54 to be easily disposed on the annular face 53.

Figure 14B:
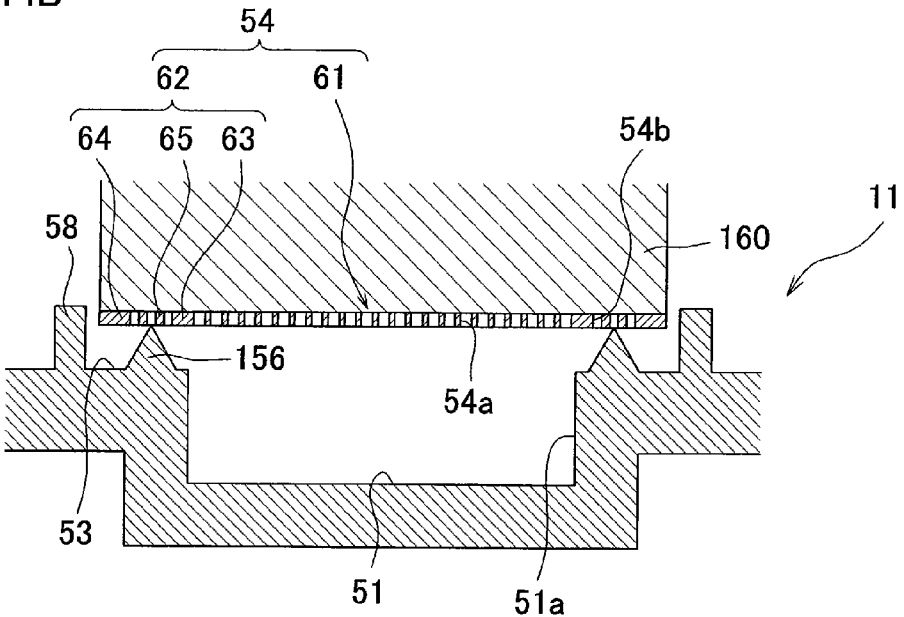
Figure 14C:
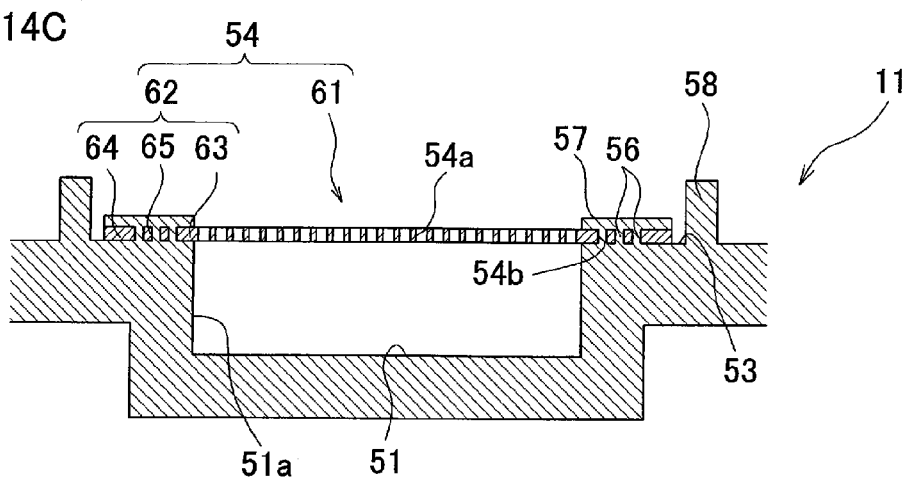

Then, as shown in FIG. 14B, an upper face of the filter plate 54 is heated and pressed by a flat lower face of a jig 160 having a heater provided therein (S5: heating and pressing step). The jig 160 is set at a temperature that allows the protrusion 156 to be melted but the filter plate 54 not to be melted. When the filter plate 54 is heated, the protrusion 156 is also heated. The protrusion 156 is melted upon reaching its melting temperature. As shown in FIG. 14C, the melted protrusion 156 enters and goes through the holes 54b. Then, beyond the hole 54b, the melted protrusion 156 radially expands on the upper face of the filter plate 54 so that its diameter is larger than a diameter of each hole 54. Portions of the protrusion 156 beyond the holes 54b spread substantially throughout an area on the upper side of the annular region 62 corresponding to the annular face 53. The portions are connected to each other. Then, the jig 160 is withdrawn to cool the melted protrusion 156. Thus, the above-described radially-expanding protrusions 56 and resin layer 57 are formed, thereby fixing the filter plate 54 to the passage component 11.

Next, while the films 41, 42, and 49 are in contact with the ends 37a, 38a, and 48a of the annular walls 37, 38, 48, the ends 37a, 38a, and 48a of the annular walls 37, 38, 48, as well as the films 41, 42 and 49, are heated. Thus, the ends 37a, 38a, and 48a of the annular walls 37, 38, 48 are melted and welded to the films 41, 42, and 49 (S6). The passage component 11 as shown in FIG. 2 is thereby manufactured.

The passage component 11 and the three plates 12 to 14 are positioned in layers. The passage component 11 and the plate 12 are fixed with screws, and the three plates 12 to 14 are fixed with an adhesive, to thereby manufacture the reservoir unit 3 (S7).

To prepare the passage unit 9, first, each of the nine plates 122 to 130 included in the passage unit 9 is subjected to an etching process using a patterned photoresist as a mask, so that holes shown in FIG. 10 are formed in the plates. Then, the plates 122 to 130 are positioned to each other so as to form the individual ink passage 132 therein, and put on one another with an epoxy-base thermosetting adhesive being therebetween. Then, the plates 122 to 130 are pressurized and heated up to a curing temperature of the thermosetting adhesive or higher. As a result, the thermosetting adhesive is cured, to secure the plates 122 to 130 to each other. Thus, the passage unit 9 as shown in FIG. 10 is obtained (S8).

To prepare the piezoelectric actuator 21, first, three green sheets made of piezoelectric ceramics are prepared. The green sheets are in advance formed so as to allow for contraction which will be caused during a baking procedure. On one of the green sheets, a conductive paste is screen printed in a pattern of the common electrode 134. Then, the green sheets are positioned to each other using a jig. The green sheet on which the conductive paste is printed in the pattern of the common electrode 134 is put under a green sheet on which no conductive paste is printed. Further, the other green sheet on which no conductive paste is printed is put under the aforesaid green sheet on which the conductive paste is printed in the pattern of the common electrode 134 (S9).

A layered structure thus obtained in S9 is degreased in the same manner as for a known ceramics, and further baked at a predetermined temperature (S10). Consequently, the three green sheets become the piezoelectric sheets 141 to 143, and the conductive paste becomes the common electrode 134. Then, on the uppermost piezoelectric sheet 141, a conductive paste is screen-printed in a pattern of the individual electrodes 135. The layered structure is heat-treated to bake the conductive paste, so that the individual electrodes 135 are formed on the piezoelectric sheet 141. Thereafter, gold including glass frits is printed on the individual electrodes 135, to form the lands 136. In this way, the actuator unit 21 as shown in FIG. 11A is prepared.

The reservoir unit preparation steps S1 to S7, the passage unit preparation step S8, and the actuator unit preparation step S9 to S10 are performed independently of one another, and therefore they may be performed either concurrently or in a random order.

Next, using a bar coater, an epoxy-base thermosetting adhesive is applied to an upper face of the passage unit 9 obtained in S8 on which many openings for the pressure chambers 110 are formed (S11). Examples of the thermosetting adhesive include two-liquid mixed type one.

The actuator unit 21 is disposed on the thermosetting adhesive layer that is applied to the passage unit 9 (S12). At this time, the actuator unit 21 is supported on walls of the cavity plate 122 defining the pressure chambers 110. In addition, the actuator unit 21 is positioned relative to the passage unit 9 in such a manner that the individual electrodes are opposed to the respective pressure chambers 110. The positioning is based on positioning marks (not shown) that have been provided on the passage unit 9 and the actuator unit 21 previously in S8 to S10. At this time, moreover, six filter plates 95*a* and 95*b* are disposed so as to cover the respective ink supply ports 101.

Next, by means of a heat/pressure device (not shown), a layered structure made up of the passage unit 9, the thermosetting adhesive existing between the passage unit 9 and the actuator unit 21, and the actuator unit 21 is pressurized while heated up to a curing temperature of the thermosetting adhesive or higher (S13). As a result, the openings for the pressure chambers 110 are closed with the actuator unit 21, and the filter plates 95*a* and 95*b* are fixed on the passage unit 9. Then, the layered structure is taken out of the heat/pressure device, and cooled (S14). In this way, the head main body 2 made up of the passage unit 9 and the actuator unit 21 is manufactured. Then, the FPC 6 is electrically connected to the actuator unit 21 (S15).

Next, an epoxy-base thermosetting adhesive is applied to lower faces of the protrusions 89*a* to 89*d* of the reservoir unit 3 (S16). Positioning pins are put through the positioning holes 87*a*, 87*b*, 92*a*, and 92*b* which are formed in the reservoir unit 3 and through the positioning holes 102*a* and 102*b* which are formed in the passage unit 9, thereby positioning the reservoir unit 3 and the head main body 2 to each other. By means of a heat/pressure device (not shown), a layered structure of the reservoir unit 3 and the head main body 2 is pressurized while heated up to a curing temperature of the thermosetting adhesive or higher (S17). Thus, the lower faces of the protrusions 89*a* to 89*d* are fixed to the upper face of the passage unit 9 with the filter plates 95*a* and 95*b* therebetween. Then, the layered structure is taken out of the heat/pressure device, and cooled (S18). In this way, the ink-jet head 1 is manufactured.

In a case where the filter plate 54 and the passage component 11 are fixed to each other by an adhesive only, the adhesive sometimes cannot provide sufficient adhesion depending on materials of the filter plate 54 and the passage component 11. In the ink-jet head 1 of the above-described embodiment, however, the filter plate 54 is fixed to the passage component 11 by means of the radially-expanding protrusions 56. This can reduce the problem of separation of the filter plate 54.

Portions of the radially-expanding protrusions 56 beyond the holes 54 are connected to each other, thus forming the resin layer. This makes it more difficult for the filter plate 54 to be separated from the passage component 11.

Since the resin layer is formed over an entire circumference of the annular region 62, it is further more difficult for the filter plate 54 to be separated from the passage component 11.

Since the first non-pierced area 63 is formed within the annular region 62 of the filter plate 54, the portions of the radially-expanding protrusions 56 beyond the holes 54*b* hardly reaches the inner region 61. That is, since the holes 54*b* and the holes 54*a* are separated by the first non-pierced area 63, the holes 54*a* can be prevented from being closed with the portions of the radially-expanding protrusions 56 beyond the holes 54*b*, that is, the resin layer 57. This can prevent reduction of an effective filtration area of the filter plate 54 which may be caused if the holes 54*a* of the inner region 61 are closed. That is, in this embodiment, an effective filtration area of the filter plate 54 is constant, and does not vary among heads 1. In addition, the non-pieced area 63, in which no hole is formed, is stronger than either of the inner region 61 in which the holes 54*a* are formed and the intermediate area 65 in which the holes 54*b* are formed. Therefore, even though the filter plate 54 vibrates when ink passes therethrough, the filter plate 54 is not easily damaged.

Not only the first non-pieced area 63 but also the second non-pieced area 64 is provided in the annular region 62 of the filter plate 54. The non-pierced area 64 improves rigidity of the filter plate 54, and functions as a reinforcement of the filter plate 54. Due to presence of the non-pierced area 64, vibration of the filter plate 54 in its outer periphery, which occurs when ink passes through the filter plate 54, can be suppressed as compared with the filter plate having holes in its outer periphery. This can prevent a part of the outer periphery of the filter plate 54 from falling out to cause a foreign matter. In addition, since no hole is formed in the non-pieced area 64, strength of the filter plate 54 is improved even more. Therefore, the filter plate 54 can handle easily.

A diameter of the hole 54*b* which is formed in the intermediate area 65 is smaller than a diameter of the hole 54*a* which is formed in the inner region 61. Therefore, even though the radially-expanding protrusions 56 are not embedded in some holes 54*b*, the holes 54*b* do not permit a foreign matter to pass therethrough and only ink is permitted to pass through the holes 54*b*. That is, the intermediate area 65, in which a hole 54*b* having no radially-expanding protrusions 56 embedded therein exists, can catch a smaller foreign matter than the inner region 61 can. Therefore, initial performance of the filter plate 54 is not spoiled.

In the method of manufacturing the ink-jet head 1 of this embodiment, the protrusion 156 that is formed on the annular face 53 of the passage component 11 is melted in the heating and pressing step S5, and the melted protrusion 156 is embedded in the holes 54b that are formed in the filter plate 54. Further, portions of the melted protrusion 156 beyond the holes 54b radially expand, and a diameter of each of the portions becomes larger than a diameter of each hole 54b. Therefore, the filter plate 54 is fixed to the passage component 11 with a problem of separation of the filter plate 54 reduced.

In the passage component preparation step S2, the protrusion 156 is formed in a tapered shape. Therefore, an end of the protrusion 156 can easily be melted in S5. This can ensure that the filter plate 54 is fixed. In addition, even if the end of the protrusion 156 has an inaccurate flatness before being melted, the inaccuracy can be compensated at the time when the end of the protrusion 156 is melted down.

In the ink-jet head 1 of the above-described embodiment, many radially-expanding protrusions 56 are provided. However, it suffices that at least one radially-expanding protrusion 56 is embedded in any of the holes 54b and a portion of the protrusion 56 beyond the hole 54b radially expands to have a diameter larger than a diameter of the hole 54b.

The protrusion 156 may not be embedded in all the holes 54b, but may embedded in some of the holes 54b. It may also be possible that a part of the protrusion 156 radially expands.

The radially-expanding protrusions 56 may not necessarily form the resin layer 57. For example, the portions of the radially-expanding protrusions 56 beyond the holes 54b may not be connected to each other but may increase their own diameters independently of one another.

The resin layer 57 may not be formed over an entire circumference of the annular region 62. In such a case as well, the filter plate 54 is well fixed to the annular face 53.

It may also be possible that the filter plate 54 has either one of the non-pierced areas 63 or 64. Alternatively, it may also be possible that the filter plate 54 has neither of the non-pierced areas 63 nor 64.

A diameter of the hole 54b that is formed in the annular region 62 may be larger than a diameter of the hole 54a that is formed in the inner region 61, as long as an upper face of the intermediate region 65 is fully covered with the resin layer 57.

The end of the protrusion 156 may not have a tapered shape.

The ink-jet head according to the present invention may be manufactured by a method other than that described in the above embodiment. For example, the filter plate 54 may be placed on the annular face 53 on which no protrusion 156 is formed. Then, resin is filled in the holes 54b formed in the filter plate 54, and a resin plate functioning as the resin layer 57 is placed on the upper face of the filter plate 54. In this condition, the resin plate is heated and pressed to thereby form the radially-expanding protrusions 56 and the resin layer 57 as shown in FIG. 14C.

The ink-jet head according to the present invention is not limited to piezo-type ink-jet heads, and may be thermal-type ink-jet heads, electrostatic-type ink-jet heads, and the like. Moreover, applications of the ink-jet head according to the present invention are not limited to printers. It is also applicable to ink-jet type facsimiles or copying machines.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An ink-jet head comprising a passage component made of resin and a filter plate through which ink is filtered, an ink passage formed in the passage component, the filter plate being fixed to the passage component and having a melting point higher than that of the passage component, wherein:
   the filter plate has an annular region and an inner region surrounded by the annular region, and a plurality of holes are formed through the filter plate in a thickness direction of the filter plate, in the annular region and the inner region, respectively;
   the passage component has a filter support face that supports one face of the filter plate extending in a direction perpendicular to the thickness direction, the filter support face being in contact with the annular region but out of contact with the inner region; and
   a holder is formed on the filter support face, the holder penetrating through at least one of the holes formed in the annular region and covering the other face of the filter plate, the holder exposed to the ink passage.

2. The ink-jet head according to claim 1, wherein:
   a plurality of the holders, which respectively correspond to the holes formed in the annular region, are formed on the filter support face; and
   the holders are connected to each other on the other face of the filter plate, thereby forming a resin layer which is not opposed to the inner region.

3. The ink-jet head according to claim 2, wherein the resin layer is formed over an entire circumference of the annular region.

4. The ink-jet head according to claim 1, wherein:
   a first non-pierced area of annular shape distant from an outer edge of the filter plate is formed within the annular region; and
   in the first non-pierced area, none of the holes are formed over a width larger than a pitch of the holes formed in the inner region.

5. The ink-jet head according to claim 4, wherein:
   a second non-pierced area of annular shape is formed within the annular region so as to be continuous with the outer edge of the filter plate; and
   in the second non-pierced area, none of the holes are formed over a width larger than a pitch of the holes formed in the inner region.

6. The ink-jet head according to claim 1, wherein a diameter of the holes formed in the annular region is equal to or smaller than a diameter of the holes formed in the inner region.

7. The ink-jet head according to claim 1, wherein:
   the passage component further has an annular wall that defines an outer edge of the filter support face and encloses the filter plate at a distance from the filter plate; and
   a level of the annular wall in the thickness direction is higher than a level of the other face of the filter plate.

8. The ink-jet head according to claim 1, wherein the ink passage extends parallel to the filter plate.

9. A method of manufacturing an ink-jet head that includes a passage component made of resin and a filter plate through which ink is filtered, an ink passage formed in the passage component, the filter plate being fixed to the passage component and having a melting point higher than that of the passage component, the method comprising the steps of:
   preparing the passage component having an annular face that annularly extends in a plane, a step face that is continuous with an inner circumferential border of the annular face and extends in a direction crossing the plane, and a protrusion that is formed on the annular face;

preparing the filter plate through which a plurality of holes are formed in a thickness direction of the filter plate;

bringing one face of the filter plate into contact with the protrusion while opposing at least one of the holes to the protrusion; and heating the protrusion and pressing the filter plate to the annular face, in such a manner that the melted protrusion is embedded in at least one of the holes and, in its portion beyond the holes, radially expands thus having a diameter larger than a diameter of the holes and thus being exposed to the ink passage, to thereby fix the filter plate to the passage component.

10. The method according to claim 9, wherein, in the step of heating and pressing, the protrusion is heated and the filter plate is pressed to the annular face, in such a manner that the melted protrusion is embedded in two or more of the holes, and portions of the melted protrusion beyond the respective holes are connected to each other thus forming a resin layer on the other face of the filter plate.

11. The method according to claim 9, wherein:
in the step of preparing the passage component, the protrusion is formed over an entire circumference of the annular face; and
in the step of heating and pressing, the protrusion is heated and the filter plate is pressed to the annular face, in such a manner that the resin layer is formed over the entire circumference of the annular face.

12. The method according to claim 9, wherein:
in the step of preparing the filter plate, the filter plate is formed having a first non-pierced area of annular shape distant from an outer edge of the filter plate, in which none of the holes are formed over a width larger than a pitch of the holes; and
in the step of bringing into contact, the one face of the filter plate is brought into contact with the annular face in such a manner that an inner circumferential border of the annular face is opposed to the first non-pierced area.

13. The method according to claim 12, wherein, in the step of preparing the filter plate, the filter plate is formed having a second non-pierced area of annular shape continuous with the outer edge of the filter plate, in which none of the holes are formed over a width larger than a pitch of the holes.

14. The method according to claim 9, wherein, in the step of preparing the filter plate, the holes are formed in an annular region of the filter plate which will be in contact with the annular face of the passage component, and a diameter of the holes is equal to or smaller than a diameter of the holes formed in an inner region of the filter plate which is surrounded by the annular region and will not be in contact with the annular face.

15. The method according to claim 9, wherein, in the step of preparing the passage component, the protrusion is formed so that its end has a tapered shape.

16. The method according to claim 9, wherein, in the step of preparing the passage component, an annular wall defining an outer edge of the annular face is formed in such a manner that, in the step of bringing into contact, the annular wall encloses the filter plate at a distance from the filter plate and has a level in the thickness direction higher than a level of the other face of the filter plate that is in contact with the protrusion.

17. The method according to claim 9, wherein, in the step of preparing the passage component, the annular face is formed to be parallel to that the ink passage.

18. An ink-jet head comprising a passage component made of resin and a filter plate through which ink is filtered, the filter plate being fixed to the passage component and having a melting point higher than that of the passage component, wherein:
the filter plate has an annular region and an inner region surrounded by the annular region, and a plurality of holes are formed through the filter plate in a thickness direction of the filter plate, in the annular region and the inner region, respectively;
the passage component has a filter support face that supports one face of the filter plate extending in a direction perpendicular to the thickness direction, the filter support face being in contact with the annular region but out of contact with the inner region;
a holder is formed on the filter support face, the holder penetrating through at least one of the holes formed in the annular region and covering the other face of the filter plate; and
a diameter of the holes formed in the annular region is equal to or smaller than a diameter of the holes formed in the inner region.

19. A method of manufacturing an ink-jet head that includes a passage component made of resin and a filter plate through which ink is filtered, the filter plate being fixed to the passage component and having a melting point higher than that of the passage component, the method comprising the steps of:
preparing the passage component having an annular face that annularly extends in a plane, a step face that is continuous with an inner circumferential border of the annular face and extends in a direction crossing the plane, and a protrusion that is formed on the annular face;

preparing the filter plate through which a plurality of holes are formed in a thickness direction of the filter plate;

bringing one face of the filter plate into contact with the protrusion while opposing at least one of the holes to the protrusion; and heating the protrusion and pressing the filter plate to the annular face, in such a manner that the melted protrusion is embedded in at least one of the holes and, in its portion beyond the holes, radially expands thus having a diameter larger than a diameter of the holes, to thereby fix the filter plate to the passage component, wherein, in the step of preparing the filter plate, the holes are formed in an annular region of the filter plate which will be in contact with the annular face of the passage component, and a diameter of the holes is equal to or smaller than a diameter of the holes formed in an inner region of the filter plate which is surrounded by the annular region and will not be in contact with the annular face.

* * * * *